United States Patent
Liu et al.

(10) Patent No.: US 12,287,777 B2
(45) Date of Patent: Apr. 29, 2025

(54) NATIVELY SUPPORTING JSON DUALITY VIEW IN A DATABASE MANAGEMENT SYSTEM

(71) Applicant: Oracle International Corporation, Redwood Shores, CA (US)

(72) Inventors: Zhen Hua Liu, San Mateo, CA (US); Juan R. Loaiza, Woodside, CA (US); Sundeep Abraham, Redwood City, CA (US); Shubha Bose, Foster City, CA (US); Hui Joe Chang, San Jose, CA (US); Shashank Gugnani, Foster City, CA (US); Beda Christoph Hammerschmidt, Palo Alto, CA (US); Tirthankar Lahiri, Palo Alto, CA (US); Ying Lu, Sunnyvale, CA (US); Douglas James McMahon, Redwood City, CA (US); Aurosish Mishra, Foster City, CA (US); Ajit Mylavarapu, Mountain View, CA (US); Sukhada Pendse, Foster City, CA (US); Ananth Raghavan, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/966,730

(22) Filed: Oct. 14, 2022

(65) Prior Publication Data
US 2024/0126743 A1    Apr. 18, 2024

(51) Int. Cl.
G06F 16/00    (2019.01)
G06F 16/23    (2019.01)
G06F 16/2455    (2019.01)

(52) U.S. Cl.
CPC .... *G06F 16/2379* (2019.01); *G06F 16/24568* (2019.01)

(58) Field of Classification Search
CPC ...................... G06F 16/2379; G06F 16/24568
(Continued)

(56) References Cited

U.S. PATENT DOCUMENTS 6,871,204 B2    3/2005    Krishnaprasad et al.
7,024,425 B2    4/2006    Krishnaprasad et al.
(Continued)

FOREIGN PATENT DOCUMENTS

WO    WO2019/068014    4/2019

OTHER PUBLICATIONS

Barsalou, Thierry, et al., "Updating Relational Databases through Object-Based Views", ACM SIGMOD Record vol. 20, No. 2, Jun. 1991, pp. 248-257, https://doi.org/10.1145/119995.115831, published Apr. 1, 1991, 14pgs.
(Continued)

*Primary Examiner* — Charles Rones
*Assistant Examiner* — Shirley D Hicks
(74) *Attorney, Agent, or Firm* — Hickman Becker Bingham Ledesma LLP

(57) ABSTRACT

JSON Duality Views are object views that return JDV objects. JDV objects are virtual because they are not stored in a database as JSON objects. Rather, JDV objects are stored in shredded form across tables and table attributes (e.g. columns) and returned by a DBMS in response to database commands that request a JDV object from a JSON Duality View. Through JSON Duality Views, changes to the state of a JDV object may be specified at the level of a JDV object. JDV objects are updated in a database using optimistic lock.

20 Claims, 22 Drawing Sheets

```
JDDL1 = CREATE JSON RELATIONAL DUALITY VIEW employee_jdv1
    with OBJECT ID (empno) as select json_object(
                'empno' value empno,
                'ename' value ename,
                'job' value job,
                'sal' value sal)
    as obj from employee JDV Object 101 =

{   "JVDOID" : "56ADEEBD",
    "VSTAG":"51DAFE477F5677B7A6EB0F4DE13CB6984D65074787
      399C33A2448E9A55FDBB0F",
    "empno": 7369,
    "ename":"SMITH",
    "job":"Accountant"
    "sal" : "10000")
}

JDDL1' = CREATE JSON RELATIONAL RELATIONAL DUALITY VIEW
employee_jdv1
    with OBJECT ID (empno) as using JSONIZE (employee)
```

(58) Field of Classification Search
USPC .................................................. 707/600–899
See application file for complete search history.

(56) References Cited

U.S. PATENT DOCUMENTS

| | | |
|---|---|---|
| 10,936,559 B1 | 3/2021 | Jones |
| 11,169,985 B2 | 11/2021 | Innocenti |
| 11,423,001 B2 | 8/2022 | Liu |
| 11,768,834 B1 | 9/2023 | Amberden |
| 2006/0235837 A1 | 10/2006 | Chong |
| 2008/0172408 A1 | 7/2008 | Meliksetian |
| 2008/0320013 A1 | 12/2008 | Bireley |
| 2008/0320019 A1 | 12/2008 | Bireley |
| 2010/0161567 A1 | 6/2010 | Makela |
| 2010/0185869 A1 | 7/2010 | Moore |
| 2013/0117238 A1 | 5/2013 | Gower |
| 2013/0138695 A1 | 5/2013 | Stanev |
| 2014/0006342 A1 | 1/2014 | Love |
| 2014/0281748 A1 | 9/2014 | Ercegovac |
| 2016/0077853 A1 | 3/2016 | Feng |
| 2016/0253397 A1 | 9/2016 | Fryc |
| 2017/0153875 A1 | 6/2017 | Joglekar |
| 2017/0293697 A1 | 10/2017 | Youshi |
| 2018/0075091 A1 | 3/2018 | Weiss |
| 2018/0107501 A1 | 4/2018 | Roth |
| 2018/0150503 A1 | 5/2018 | Horii |
| 2018/0218019 A1* | 8/2018 | Libow ................... G06F 16/86 |
| 2018/0260428 A1 | 9/2018 | Patel |
| 2019/0065552 A1 | 2/2019 | Brantner |
| 2019/0102389 A1* | 4/2019 | LeGault ............... G06F 16/282 |
| 2019/0265982 A1 | 8/2019 | Mickelsson |
| 2019/0318272 A1 | 10/2019 | Sassin |
| 2019/0370373 A1 | 12/2019 | Hammerschmidt |
| 2019/0384571 A1 | 12/2019 | Oberbreckling |
| 2020/0201964 A1 | 6/2020 | Nandakumar et al. |
| 2020/0294633 A1 | 9/2020 | Namboodiri et al. |
| 2020/0394542 A1 | 12/2020 | Buesser |
| 2021/0081389 A1 | 3/2021 | Liu |
| 2021/0174006 A1* | 6/2021 | Stokes ................... G06Q 50/18 |
| 2023/0033054 A1 | 2/2023 | Schlueter |

OTHER PUBLICATIONS

Current Claims, in International Application No. PCT/US2023/035029, dated Feb. 7, 3 pages.
Chasseur et al., "Enabling JSON Document Stores in Relational Systems", WEBDB 2013 New York, New York USA, Jun. 23, 2013, 18 pages.
Liu, U.S. Appl. No. 17/966,736, filed Oct. 14, 2022, Non-Final Rejection, Jan. 22, 2024.
JSON Data Management—Supporting Schema-less Development in RDBMS (Year: 2014).

* cited by examiner

```
JDDL1 = CREATE JSON RELATIONAL DUALITY VIEW employee_jdv1
    with OBJECT ID (empno) as select json_object(
                'empno' value empno,
                'ename' value ename,
                'job' value job,
                'sal' value sal)
    as obj from employee
```

JDV Object 101 =

```
{   "JVDOID" : "56ADEEBD",
    "VSTAG":"51DAFE477F5677B7A6EB0F4DE13CB6984D65074787
      399C33A2448E9A55FDBB0F",
    "empno": 7369,
    "ename":"SMITH",
    "job":"Accountant"
    "sal" : "10000")
}
```

JDDL1' = CREATE JSON RELATIONAL RELATIONAL DUALITY VIEW employee_jdv1
    with OBJECT ID (empno) as using JSONIZE (employee)

FIG. 1

JQ21 = SELECT obj FROM employee_jdv1

```
REWRITE QUERY TO REFERENCE,
WITHIN JSON_OBJECT FUNCITON
EXPRESSION, BASE COLUMNS AND
OPERATORS FOR VERSION
SIGNATURE AND JDV OBJECT
IDENTIFIER
```

```
JQ21' =
SELECT json_object(
     'JVDOID'  value OID_FROM_PK(empno),
     'VSTAG'   value obj_sig(row_sig(empno,
                             ename, job, mgr, sal))
    'empno' value empno,
    'ename' value ename,
    'job' value job, ...
    'sal' value sal
      ) as obj
   FROM employee
```

FIG. 2A

```
JQ22 = SELECT obj FROM employee_jdv1
       WHERE obj.JVDOID = "56ADEEBD"

JQ22' =
SELECT json_object(
    'JVDOID'  value OID_FROMM_PK(empno),
    'VSTAG'   value obj_sig(row_sig(empno,
                            ename, job, mgr, sal))
    'empno' value empno,
    'ename' value ename,
    'job' value job, …
    'sal' value sal
      ) as obj
    FROM employee
    WHERE EXTRACT_PK_COL("56ADEEBD") = empno
```

FIG. 2B

```
JDDL3 = CREATE JSON RELATIONAL DUALITY VIEW
   employee_jdv3 WITH OBJECT ID (empno) as SELECT json_object(
                     'empno' value empnum,
                     'ename' value empname,
                     'job' value 'job'
                     'sal' value sal
                     "dept_info" value (
                           SELECT json_object(
                                 'deptno' value deptno,
                                 'dname' value dname,
                                 'loc' value loc)
                           FROM dept
                           WHERE dept.deptno = e.deptno)
                                 )
               as obj from employee
```

JDV Object 301 =

```
{    "JVDOID" : "56ADEEBD",
     "VSTAG":"…",
     "empno": 7369,
     "ename":"SMITH",
     "job":"Accountant"
     "sal" : "10000"
     "dept_info"{   "deptno":"094",
                    "dname":"Accounting",
                    "loc":"Silicon Valley"}
}

JDDL3' = CREATE or REPLACE JSON Duality View  employee_JDV5
     DUALITY VIEW using JSONIZE (employee( 'dept_info' : {dept}
)
```

FIG. 3

```
JDDL4 = CREATE JSON Duality View deptvf
        with object id (deptno) as
    SELECT json_object(
           'deptno' value deptno,
           'dname' value dname,
           'loc' value loc,
           'emp_info' value
               (SELECT json_arrayagg(json_object(
                    'empno' value empno,
                   'ename' value ename,
                    'job' value job)
                    )
               FROM employee e
               WHERE d.deptno =  e.deptno AND
                   e.job <> "Manager"
               ) as obj
    FROM dept d JDV Object 401  =
{     "JVDOID" : "59XF45",
      "VSTAG":"…",
      "deptno":"094",
      "dname":"Accounting",
      "loc":"Silicon Valley"}
      "emp_info" [
           {"empno":7369,"ename":"SMITH",
               job":"Accountant"},
           {"empno":8930,"ename":"DOE",
               job":"AP Clerk"},
           {"empno":9062,"ename":"JONES",
               job":"AP Clerk"}}
```

FIG. 4

```
JDDL4' = CREATE or REPLACE JSON Duality View deptvf Duality View
         USING JSONIZE( dept(  'emp_info' : [employee] )
```

FIG. 5
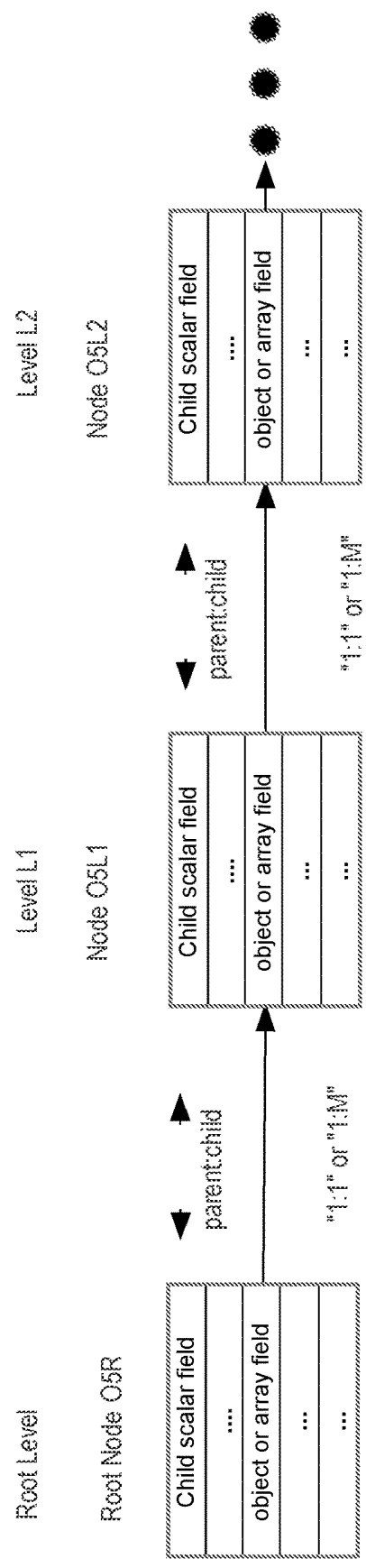
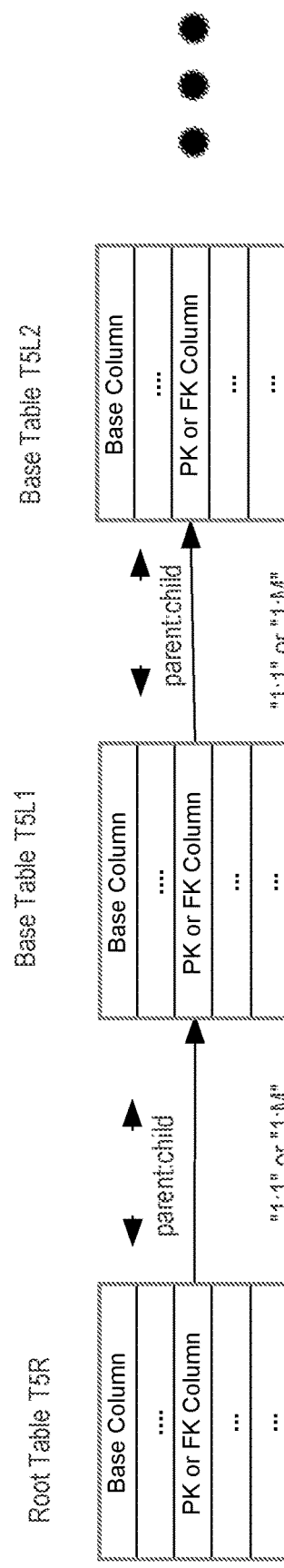

"EMPLOYEE<-[PROJECT ASSIGNMENT]->{PROJECT}"

JDV OBJECT 601:
```
{"empno" : 34, "ename": "Williams",
    "assigned_projects" : [
        {"ass_eid" :34, "ass_projid" :1, "proj_info":
            {"projid":1,"projname" : "OSON"}},
        {"ass_eid":34, "ass_projid" : 2, "proj_info":
            {"projid":2, "projname" : "PDB"}},
        {"ass_eid":34, "ass_projid" :3, "proj_info":
            {"projid":3,"projname":"IMDB"}}
    ]
}
```

"PROJECT<-[PROJECT_ASSIGNMENT->{EMPLOYEE}]"

JDV OBJECT 602 "PROJECT<-[PROJECT_ASSIGNMENT->{EMPLOYEE}]
```
{"projid":3, "projname":"OSON", "assigned_employees": [
    {"ass_eid":21, "ass_projid":3, "employee_info":
        {"empno" :21, "ename" : "John"}},
    {"ass_eid":56, "ass_projid":3,"employee_info":
        {"eid":56, "ename":"Mary"}},
    {"ass_eid":34, "ass_projid":3,employee_info":{
        "eid" :34, "ename" : "zhen"}}
  ]
}
```

FIG. 6A

FIG. 6B
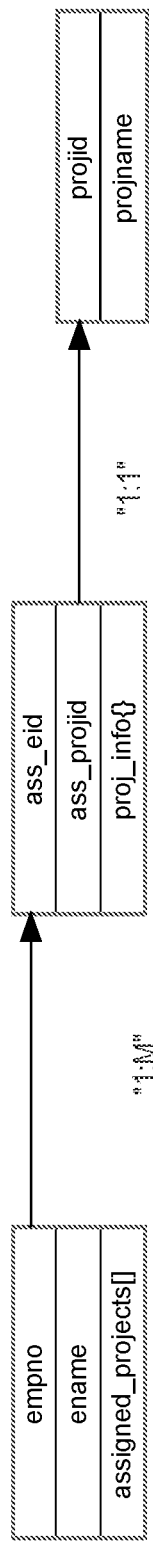
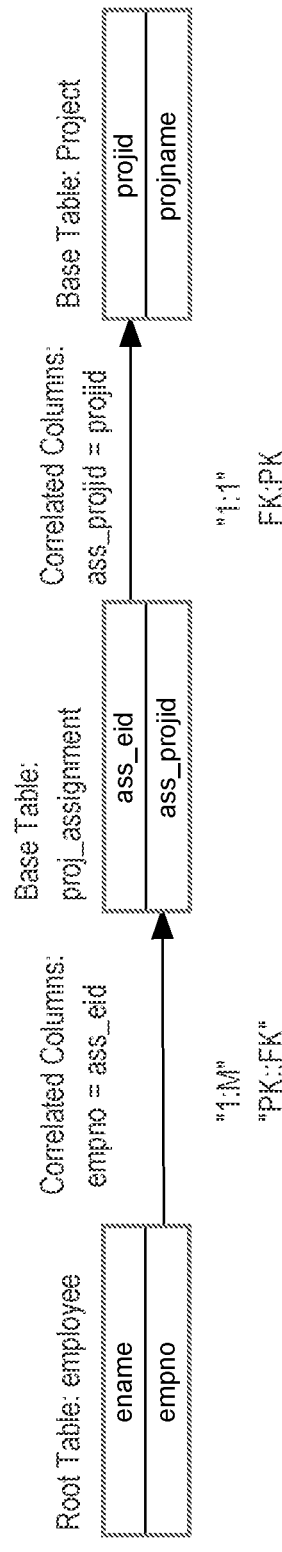

FIG. 8 record signature = record_sig(column, .....)

array signature = aggr_sig(set of object signatures and/or record signatures)

object signature = obj_sig(record signature or object signatures, ...)
or
(JSON field name, object signature)

```
JQ11 = SELECT obj FROM deptvf

JQ11' = SELECT json_object(
1102         "JVDOID" : oid_from_pk(deptno),
             "VSTAG" : snapshot_sig(
             obj_sig(
                 row_sig(deptno, dname, loc,
                 (select agg_sig(row_sig(empno, ename, loc)
                 from employee e where d.deptno =
                     e.deptno))))),
             'deptno' value deptno,
             'dname' value dname,
             'loc' value loc,
             'emp_info' value
                 (SELECT json_arrayagg(json_object(
                     'empno' value empno,
                     'ename' value ename,
                     'job' value job)
                 )
                 FROM employee e
                 WHERE d.deptno =  e.deptno
             ) as obj
       FROM dept d
```

FIG. 11

```
JDDL3' = CREATE JSON RELATIONAL DUALITY VIEW
    employee_JDV3 WITH OBJECT ID (empno) as SELECT json_object(
                'empno' value empnum,
                'ename' value empname,
                'job' value 'job'
                'sal' value sal WITH(NOUPDATE)
                "dept_info" value (
                    SELECT json_object(
                        'deptno' value deptno,
                        'dname' value dname,
                        'loc' value loc)
                    FROM dept  WITH(UPDATE)
                    WHERE dept.deptno =  e.deptno)
                        )
            as obj FROM employee WITH(UPDATE)
```

FIG. 13A

```
JDDL4' = CREATE JSON Duality View deptvf
    with object id (deptno)as
  SELECT json_object(
      'deptno' value deptno,
      'dname' value dname,
      'loc' value loc,
      'emp_info' value
          (SELECT json_arrayagg(json_object(
              'empno' value empno,
              'ename' value ename,
              'job' value job)
              )
          FROM employee e WITH(DELETE, INSERT, UPDATE)
          WHERE d.deptno =  e.deptno AND
              e.job <> "Manager"
          ) as obj
  FROM dept d
```

```
JDDL14 = CREATE JSON RELATIONAL DUALITY VIEW
    employee_jdv14 WITH OBJECT ID (empno) as SELECT json_object(
                    'empno' value empnum,
                    'ename' value empname,
                    'job' value 'job'
                    'sal' value sal
                UNNEST (
                    SELECT json_object(
                        'deptno' value deptno,
                        'dname' value dname,
                        'loc' value loc)
                    FROM dept  WITH(UPDATE)
                    WHERE dept.deptno =  e.deptno)
                    )
            as obj from employee
JDO1401 =

{    "JVDOID" : "56ADEEBD",
     "VSTAG":"…",
     "empno": 7369,
     "ename":"SMITH",
     "job":"Accountant"
     "sal" : "10000"
     "deptno":"094",
     "dname":"Accounting",
     "loc":"Silicon Valley"}
}
```

FIG. 15A

```
JSONIZE(table_hier_cons)

table_hier_cons : table_name_id   // equivalent to table_name_id{*}
   | table_name_id '{'  itemlist '}' table_name_id :
   table_identifier tab_tag_status  key_col_clause table_identifier:
   sql_identifier   //owername.tablename
1  | sql_identifier '.'  sql_identifier itemlist : item
   | item_list ', item item:
   '*'
   // getting all columns as json fields with json field name the same as
   // column name

| sql_identifier column_tag_status
   // individual column name default json field name same
   // as column name

|'{'  table_hier_cons    '}'
   // FK->PK linking, one-to-one so as []

|'['  table_hier_cons    ']'
   // PK<-FK linking, one-to-many so as []

| string_literal ':'  sql_identifier  column_tag_status
   // individual column name with json  field name

| string_literal ':' '{'  table_hier_cons    '}'
   // FK->PK linking, one-to-one so as []

| string_literal ':' '['  table_hier_cons    ']'
   // PK<-FK  linking, one-to-many so as []

| UNNEST '{'  table_hier_cons '}'
   // FK->PK linking and unnest, one-to-one so as {}
```

```
key_col_clause :
   // empty assuming no ambiguity to find primary-forein key constraint for
join by DBMS
   // colum_list can be list of PK/UK columns or FK columns
   | USING   column_list tab_tag_status:
   // nothing
   | WITH    tab_dml_option_list )

Tab_dml_option_list: tab_dml_option_singleton
| tab_dml_option_list , tab_dml_option_singleton tab_dml_option_singleton:
  CHECK | NOCHECK | UPDATE | NOUPDATE | DELETE | NODELETE|
   INSERT | NOINSERT column_tag_status:
   // nothing
   | WITH '('  col_dml_option_list  ')' col_dml_option_list: col_dml_option_singleton
| col_dml_option_list ',' col_dml_option_singleton col_dml_option_singleton:
  CHECK | NOCHECK | UPDATE | NOUPDATE column_list :
     '(' column_list ')' // specify foreign key columns or PK or unique
                         // constraint columns Column_list:  sql_identifier  // for column name
    | column_list ','  sql_identifier
```

FIG. 15B

```
JDDL-GQ = CREATE JSON DUALITY VIEW deptvfq FROM dept AS
{
DeptNumber: deptno,
DeptName: dname,
Location: loc,
        {
        Emp_info: employee @DELETE, @INSERT, @UPDATE
            {
            EmpNum: empno,
            EmpName: ename,
            Job: job
            }
        }
}
```

JSON Schema for `deptvfq`

```
{"sqlObjectName": "deptvfq",
  "sqlObjectType": "dualityView"
  "type" : "object",
  "properties" : {
    "DeptNumber":{"type":"number"},
    "DeptName": {"type":"String"},
    "Location": {"type":"String"},
     "Emp_info" {"type":"array",
                "items":{
                   "EmpNum": {"type": "number"},
                   "EmpName":{"type": "string"},
                   "Job" : {"type": "string"}
                      }
                   }
              }
}
```

FIG. 16

NATIVELY SUPPORTING JSON DUALITY VIEW IN A DATABASE MANAGEMENT SYSTEM

FIELD OF THE INVENTION

The present disclosure relates to storage of JavaScript object notation (JSON) objects in a database management system (DBMS), including relational DBMSs (RDBMS) and DBMSs that store collections of tables or documents, such as JSON objects.

RELATED APPLICATION

The present application is related to U.S. patent application Ser. No. 17/966,716, filed Oct. 14, 2022, entitled "Techniques for Comprehensively Supporting JSON Schema in a RDBMS", filed by Zhen Hua Liu, et al., the entire contents of which are herein incorporated by reference.

BACKGROUND

JSON is a lightweight data specification language for formatting "JSON objects". A JSON object comprises a collection of fields, each of which is a field name/value pair. A field name is in effect a tag name for a node in a JSON object. The name of the field is separated by a colon from the field's value.

RDBMS vendors and No-SQL vendors both support JSON functionality to varying degrees. RDBMS vendors in particular support JSON text storage in a varchar or character large object (CLOB) column and apply structured query language (SQL) and/or JSON operators over the JSON text, as specified by the SQL/JSON standard. A RDBMS may also include a native JSON data type. A column may be defined as a JSON data type and dot notation may be used to refer JSON fields within the column. JSON operators may operate on column having a JSON data type.

Another important way RDBMS vendors support JSON functionality is to enable the generation of JSON objects through object views of relational data. Under the object view approach, data for an individual JSON object is stored and retrieved across multiple columns in one or more tables of a relational database. Each of the field values of the JSON objects may be stored individually in respective columns across multiple tables of a relational database. In effect, the values of a JSON object are shredded across multiple columns of one or more underlying tables.

The object view approach provides a duality for querying JSON object content. JSON object content may be accessed as JSON objects or as relational data. Through SQL commands, JSON object content may be accessed as tables having rows and columns. Through object views, JSON object content may be returned as JSON objects, with fields that include object fields and array fields.

Unfortunately, there is no duality implemented by RDBMS vendors for changing JSON object content under the object view approach. RDBMSs provide very effective means for modifying data as relational data, efficiently processing DML (Data Manipulation Language) commands issued against columns and tables.

However, RDBMSs do not provide the capability to process commands that specify changes to JSON objects in an object view. To change a JSON object, DML commands must be issued that specify changes to underlying tables and columns.

Based on the foregoing, it is desirable to provide a way for RDBMs to handle commands that specify changes that are directed to JSON objects returned object view.

BRIEF DESCRIPTION OF THE DRAWINGS

In the drawings:

FIG. 1 is a diagram that depicts a DDL statement that defines a JSON Duality View and a JDV object returned by the JSON Duality View, according to an embodiment of the present invention.

FIG. 2A is a diagram that depicts rewriting a database command based on a JSON Duality View, according to an embodiment of the present invention.

FIG. 2B is a diagram that depicts a DDL statement that defines a JSON Duality View and a JDV object returned by the JSON Duality View, where the JSON Duality View is based on a single root table, according to an embodiment of the present invention.

FIG. 3 is a diagram that depicts a DDL statement that defines a JSON Duality View and a JDV object returned by the JSON Duality View, where the JSON Duality View includes a root table and a child table for an object field within the object view schema of the JSON Duality View, according to an embodiment of the present invention.

FIG. 4 is a diagram that depicts a DDL statement that defines a JSON Duality View and a JDV object returned by the JSON Duality View, where the JSON Duality View includes a root table and a child table for an array field within the object view schema of the JSON Duality View, according to an embodiment of the present invention.

FIG. 5 is a diagram that depicts an archetypes of object hierarchy and table hierarchy of a JSON Duality View, according to an embodiment of the present invention.

FIG. 6A is a diagram depicting a JDV objects returned by three-table JSON Duality Views FIG. 6B is a diagram that depicts an object hierarchy and table hierarchy of a JSON Duality View, according to an embodiment of the present invention.

FIG. 8 depicts version signature functions, according to an embodiment of the present invention.

FIG. 11 depicts a database command rewritten to return a JDV object, according to an embodiment of the present invention.

FIG. 13A depicts a DDL statement defining a JSON Duality View with annotations depicting change permissions, according to an embodiment of the present invention.

FIG. 13B depicts a DDL statement defining a JSON Duality View with annotations depicting change permissions, according to an embodiment of the present invention.

FIG. 14 depicts a DDL statement defining a JSON Duality View with annotations depicting change permissions, and a JDV object returned by the JSON Duality View, according to an embodiment of the present invention.

FIGS. 15A and 15B depict a syntax for DDL statements used to define JSON Duality Views, according to an embodiment of the present invention.

FIG. 16 depicts a DDL statement used to define JSON Duality Views using a simplified syntax and a JSON schema of JSON Duality View.

DETAILED DESCRIPTION

Figure 7:
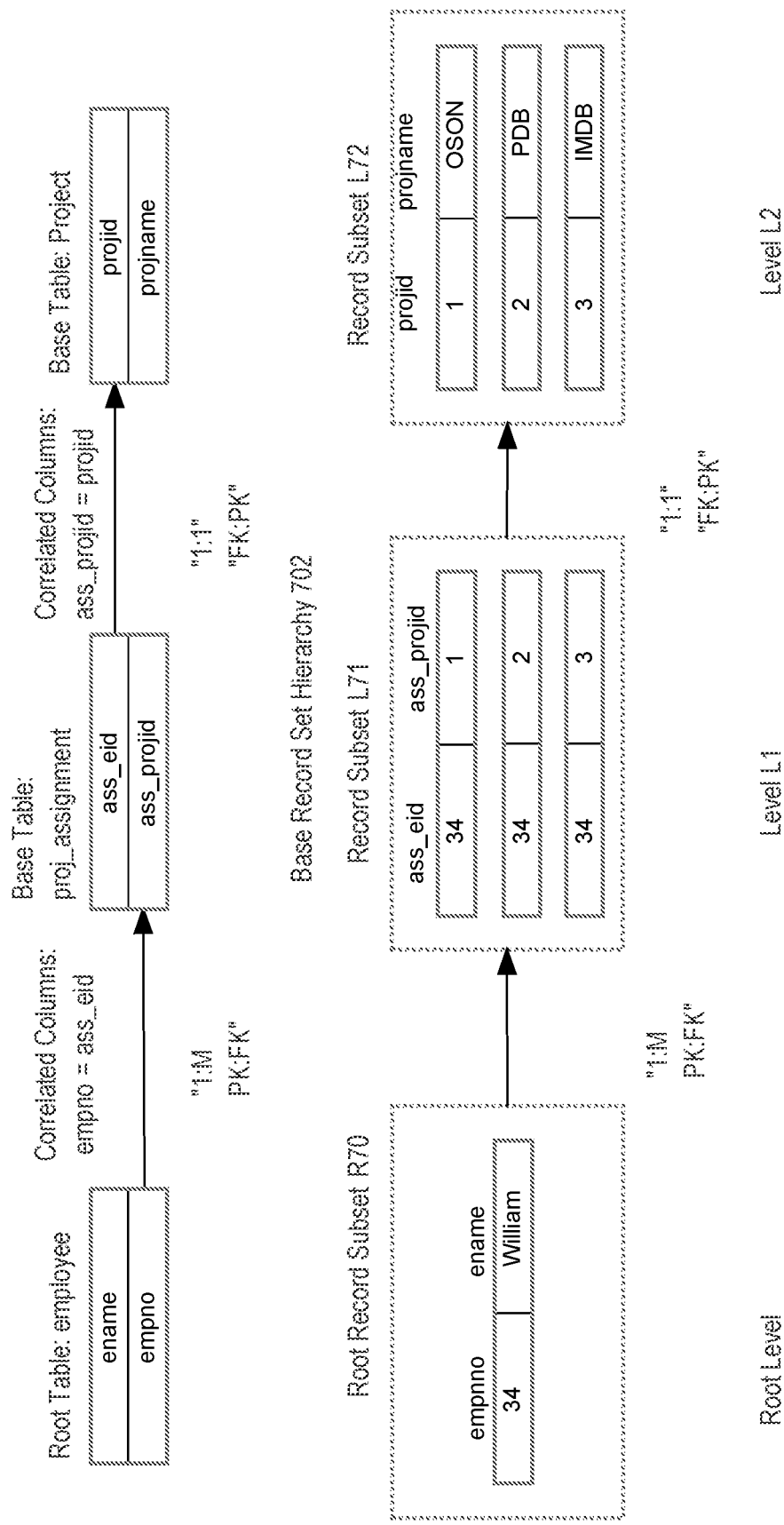
FIG. 7 depicts a base record set hierarchy and a corresponding table hierarchy of a JSON Duality View, according to an embodiment of the present invention.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

Overview

Described herein are JSON Duality Views. JSON Duality Views are object views that return JSON Duality View objects ("JDV objects"). JDV objects are virtual because they are not stored in a database as JSON objects. Rather, JDV objects are stored in shredded form across tables and table attributes (e.g. columns) and returned by a DBMS in response to database commands that request a JDV object from a JSON Duality View.

Importantly, through JSON Duality Views, changes to the state of a JDV object may be specified at the level of a JDV object. From a general point of view, this capability is analogous to specifying a state change at the column level within a DBMS. A DBMS can execute a database statement that assigns a value to a column. Similarly, a DBMS can execute a statement that assigns or sets the state of a JDV object to a copy or instance of the JDV object that has been changed. The DBMS determines the particular underlying records in the database that need to be modified and then modifies those records.

As a result, changes may be specified at the level of a JDV object or at the level of an underlying attribute of an underlying records that store content of the JDV object. The ability to specify changes at these two levels may be referred to as data manipulation duality.

Applications that change JSON objects are configured based on the assumption that changes to JSON objects can be made serially. Changes are made serially when, after a database transaction assigns a new state to a JSON object that reflects the changes made by the database transaction and then commits the new state of the JSON object, at the instant the new state of the JSON object is committed the current state of the JSON object reflects only those changes.

To assure serializability, a JDV object may be changed using pessimistic concurrency control. Under pessimistic concurrency control, an application begins a database transaction and "pessimistically" locks a JDV object, which, at a minimum, locks all the underlying records of a JDV object. The application then retrieves a copy of the JDV object through a JSON Duality View, makes changes to the copy, and then issues a database command to the DBMS through the database transaction to update the JDV object to the copy.

Pessimistic concurrency control assures serializability because while the JDV object is locked, no other changes can be made to the underlying records. Unfortunately, pessimistic concurrency control adversely affects system performance by generating relatively more locks, which are held for relatively longer periods of time. Applications, particularly web applications interfacing with a DBMS over the Internet, may hold locks on JDV objects for relatively very long periods of time.

Described herein as an alternative to pessimistic concurrency control is an approach for updating a JDV object that uses optimistic concurrency control. The approach minimizes locking while assuring serializability. Under the approach, a copy of a JDV object is retrieved from a DBMS through a JSON Duality View. The copy of the JDV object is modified to a new version. A database statement is submitted to update the JSON object to the new version. In response, the DBMS updates and commits the new version only if the DBMS can assure serializability. The number of underlying records and the period for which the records are locked are minimized. All the underlying records of the JDV object do not need to be locked before a copy is retrieved to be modified, as under pessimistic concurrency control.

The approach for optimistic concurrency control is referred to herein as optimistic serialized updating.

Applicability to Various Kinds of DBMS's.

The approaches described herein are applicable to various types of DBMSs. A DBMS manages a database. Database data may be stored in one or more collections of records. The data within each record is organized into one or more attributes. In relational DBMSs, the collections are referred to as tables (or data frames), the records can be referred to as rows, and the attributes are referred to as columns. In a document DBMS ("DOCS"), a collection of records is a collection or table of documents, and each of the records may be a data object marked up in a hierarchical-markup language, such as a JSON object or XML, document. The attributes are referred to as JSON fields or XML elements. The term field is used herein to refer to a JSON field.

The techniques are illustrated within the context of a relational DBMS that supports execution of SQL statements to access and change the database of the DBMS. In a relational database, the columns of a table each store a scalar data type or a composite data type, such as an abstract data type. However, embodiments of the present invention are not necessarily limited to such relational DBMSs. To emphasize the applicability of techniques described herein beyond relational DBMSs, a column of a table is referred to herein as an attribute and a row in a table is referred to herein as a record. In the description of SQL statements presented herein, a column referenced in a SQL statement is referred to herein as an attribute.

Root Collection/Table Definition

JSON Duality Views may be used to return JDV objects of varying complexity. A JSON Duality View has a single root table. In general, the attributes of a root table are mapped by a JSON Duality View to a scalar field of an object view schema defined by a JSON Duality View. A JSON Duality View often maps attributes from multiple tables to an object view schema, as shall be described in detail later. A table or attribute mapped by a JSON Duality View to fields of an object view schema defined by the JSON Duality View are respectively referred to herein as a base table or a base attribute with respect to the JSON Duality View, the object view schema, or a JDV object returned from the JSON Duality View. By mapping JSON fields to base attributes and base tables, a JSON Duality View defines an object view schema.

FIG. 1 shows a base case for a JSON Duality View based only on one table, which is a root table. Referring to FIG. 1, DDL statement JDDL1 defines JSON Duality View employee_jdv1, which is based on root table employee. The clause JSON MAPPING VIEW specifies that the DDL statement JDDL1 is defining a JSON Duality View having the name that follows, which is employee_jdv1.

Like DDL statements used to define views in general, DDL statement JDDL1 defines a primary query expression that projects attributes that are the attributes of the view. In the case of a JSON Duality View, the attribute projected is a JDV object conforming to an object view schema. The term view query expression refers to herein to the primary query expression defined by the JSON Duality View or by a DDL statement defining the JSON Duality View.

The view query expression in JDDL1 projects a JSON object returned by the operator json_object( ). A json_object( ) operator expression includes a field mapping that maps the field name of an object view schema to a source SQL expression that evaluates to the value of the field. The SQL expression is often an attribute name of an attribute in a source table listed in the respective FROM clause of the view query expression. JDDL1 maps the value of attributes empno, empname, job and sal from root table employee to JSON fields of the same name, which are empno, empname, job and sal. By mapping fields in this way, the view query expression defines an object view schema that includes these fields at the root level of the object view schema. A root level shall be described later.

JDV Object 101 is a JDV object returned by employee_jdv1. An example of a query statement that may be executed to generate JDV Object 101 is:

SELECT obj FROM employee_jdv1

JDV Object 101 includes field-value pairs empno": 7369, "type": "ename": "SMITH", "job": "Accountant" and "sal": "1000", which are generated from a base record's base attributes empno, ename, job, and sal, respectively of root table employee. A record whose values are used to generate field values is referred to herein as a base record. As shall be described in further detail, JDV object field values may be generated from multiple base records from multiple tables. The multiple base records are referred to herein as a base record set.

System Generated Fields

Fields JDVOID and VSTAG are fields a DBMS automatically generates for any JDV objects returned by a JSON Duality View. Any object view schema of a JSON Duality View is referred to herein as including these fields. A JDVOID field stores a JDV object identifier, which is a unique identifier generated by a DBMS for a JDV object to uniquely identify the JDV object among other JDV objects returned by the JSON Duality View, or even JDV objects returned by other JSON Duality Views. Copies of JDV objects are referred to herein as being the same if the respective JDV object identifiers in the JDVOID field match. The copies however may be different versions with different content.

A DBMS generates a JDV object identifier based on the definition of the JDV object's JSON Duality View. JDDL1 includes an OBJECT ID clause that specifies one or more object ID attributes for a JDV object identifier. The one or more object ID attributes must include at least a primary key of the root table. JDDL1 includes the clause OBJECT ID (empno), thereby defining empno as an object ID attribute for JDV object identifiers generated for employee_jdv1.

A value of an object ID attribute does not become part of the JDV object identifier; rather an object ID attribute value is an input for generating a JDV object identifier. The data type domain of Object ID attributes includes many data types. For example, a primary key may be a integer, a real number, or a string character. On the other hand, JDV object identifiers generated for any JDV object from any JSON Duality View have the same data type. JVD object identifiers have a data type that enables efficient comparison of JDV object identifiers to determine equality. Equality is determined without the need for data type casting, as might be needed if primary keys were directly used as a JDV object identifier. If the respective JDV object identifiers of JDV objects match, then the JDV objects are logically a version of the same JDV object, though their content may differ because the JDV objects have different field values. Furthermore, the object ID attribute value is encoded in such a way within a JDV object identifier that an original input object ID attribute value may be generated from the encoding. The encoding may also include such information as the data type of the object ID attribute and length.

Version Identifier

Field VSTAG is a version signature field that contains a version signature. A version signature is unique for each version of a particular JDV object. As shall be explained in greater detail, a version signature is generated using the base attribute values as input to a hash-based algorithm, much like an algorithm for a digital signature. As base attribute values for a JDV object change, the JDV object changes and transitions from one version to another. Each version yields a different version signature because the base attribute values changed.

Version identifiers may be used to determine whether a previously retrieved JDV object has changed. If the version identifier of the previously retrieved JDV object returned by a JSON Duality View does not match a version currently returned by the JSON Duality View, then any underlying base attribute values have changed.

According to an embodiment, a DBMS implements functions that may be used to generate JDV object identifiers and version signatures ("version signature functions"). The functions may be used in database statement rewrites that reference JSON Duality Views.

Referring to FIG. 2A, database statement JQ21 is a SELECT statement projecting JDV objects to return from employee_jdv1. JQ21 is rewritten into database statement JQ21' to include a json_object( ) operator expression. The field mapping of the json_object( ) operator expression maps JSON fields to base attributes of root table employee.

In addition, the field mapping maps fields JVDOID and VSTAG to function invocations for generating a JDV object identifier and a version signature. JVDOID is mapped to OID_FROM_PK (empno). Oid_from_pk( ) is a JDV object ID function, which takes as input one or more JDV object identifier attributes, one of which should be a primary key. In the case of JQ21', primary key empno is the only JDV object identifier attribute defined for employee_jdv1.

VSTAG is mapped to object_sig(record_sig(empno, ename, job, sal)). Obj_sig( ) and record_sig( ) are version signature functions. Record_sig( ) takes as input arguments one or more input base attributes. In JQ21', the input attributes include all base attributes mapped by the field mapping of the json_object( ) expression. Version signature functions are described in greater detail later.

Finally, a primary key may comprise multiple attributes. When a primary key comprises multiple attributes, referring to a value of the primary key herein refers to the values of the multiple attributes collectively.

Querying by Specifying JDVOID

A JDV object ID may be used to identify a JDV object in a database statement. The database statement may be rewritten to identify the root record in the respective root table using the primary key for the root table. To facilitate using a primary key in this way, a DBMS implements object ID translation functions, which are functions that translate a JDV object identifier encoding of an object ID attribute value to the object ID attribute value. The translated value may be referred to by a predicate expression. If the object ID attribute value is a primary key value on the object ID attribute, the translated value may be referred to by a predicate expression on the primary key to select the respective JDV object by selecting the record for the JDV object in the root table.

FIG. 2A shows a rewrite of database statement JQ22 that specifies to return a JDV object that has a particular JDV object ID. Database statement JQ22 is similar to JQ21 except that JQ22 includes a predicate on the JVDOID field.

JQ22 is rewritten to JQ22'. It includes the object ID translation function invocation EXTRACT_PK_COL ("56ADEEBD") in an equality predicate that compares the return value of the function to the object ID attribute empno. The DBMS generates the predicate in this way in response to determining that empno is the primary key that is the object ID attribute defined by JSON Duality View employee_jdv1.

A JSON Duality View may specify multiple object ID attributes. According to an embodiment, JDV object IDs are generated as a concatenation of the respective encodings of each value of the multiple object ID attributes. An object ID translation function includes an argument specifying which object ID attribute value to return.

For example, table employee has a primary key comprising multiple attributes, which are empno and emptyp. Accordingly, the object ID clause for employee_jdv1 is OBJECT ID (empno, emptyp).

A predicate in a database statement rewritten from JQ22 would include a predicate with two equality predicate conditions, one for each object ID attribute of the primary key, as follows:

WHERE EXTRACT_PK_COL("56ADEEBD",1)= empno and

EXTRACT_PK_COL("56ADEEBD",2)=emptyp

The second argument of extract_pk_col( ) is a number that identifies the object ID attribute to return based on the attribute's position in the object ID clause for the respective JSON Duality View.

The rewrite of JQ22 to JQ22' is an example of avoiding a functional evaluation of a predicate expression that references an object view schema field of a JSON Duality View. Under functional evaluation, JDV objects from a JSON Duality View are each materialized into an in-memory representation that can be evaluated to determine whether a field satisfies a predicate expression, such as the predicate expression in JQA below.

JQA=SELECT obj FROM employee_jdv1

WHERE obj.job="Manager"

Under functional evaluation, each JDV object returned by JSON Duality View employee_jdv1 is materialized into a navigable in-memory representation, which is functionally evaluated to determine whether field job equals "Manager".

To avoid functional evaluation to evaluate the predicate expression, JQ* may be rewritten to replace the predicate expression on the field job with a predicate expression on the base attribute of job, similar to described for JQ22 and JQ22'. The DBMS's execution of the rewritten statement avoids functional evaluation of the predicate expression on the field job of JDV objects in JSON Duality View employee_jdv1, thereby improving the execution speed and reducing consumption of computer resources to evaluate JQ* by the DBMS.

For purposes of exposition, a JDV object is referred to herein as being returned by a JSON Duality View when a database command may be issued to a DBMS requesting a JDV object from a JSON Duality View and the JDV object is returned as a result for the database command or otherwise generated while executing the. JQ22 is an example of such a database statement. Even though JDV objects are virtual objects, JDV objects are referred to as being from, in, or contained by a JSON Duality View if the JDV object can be returned by the JSON Duality View.

According to an embodiment, a JDV object returned by a JSON Duality View has a JSON data type native to a DBMS. A JDV object stored in memory may have the OSON OSON (Oracle™ JSON) data type storage format. The OSON format encodes strings and other forms of values according to a local dictionary stored in the JSON object and includes encoded mappings and offsets that represent the hierarchical relations between the fields of the JSON object. The format not only compresses a JSON document but enables efficient navigation of the JSON object to facilitate evaluation of path expressions against the JSON object. Because OSON provides both of these advantages, it is used for byte-addressable memory and block-based memory.

Cardinality Relationships

As already mentioned, a JSON Duality View may map fields to attributes of a base table other than the root table of the JSON Duality View. The other table may be a base table for child fields of an object field or an array field. Constructing a JSON Duality View definition for a multi-table JSON Duality View depends on cardinality relationships between parent fields and their respective child fields and among the root table and one or more base tables.

A JSON object has intra-object cardinality relationships. A cardinality relationship may exist either between the JSON object and any of its child fields, an object field and any of its child fields, or an array field and any of its child fields. With respect to child fields of a JSON object, object field, or array field, the JSON object, object field, or array field may be referred to herein as a parent of the child fields. A parent that is an object field or array field may be referred to herein as a parent field.

There are two types of intra-object cardinality relationships between a parent and its child fields. When a parent field is an array field, a parent has a 1:N (one to:one or more) cardinality relationship with its child fields. There may be multiple instances of a child field, one instance in each element of an array field. When a parent field is an object field, a parent has a 1:1 (one-to-one) cardinality relationship with a child field of the object field.

In an embodiment, a multi-table JSON Duality View is defined based on a view query expression that includes a subquery expression within an outer query expression. The outer query expression references a parent table and the subquery expression references a child base table of the parent table. A parent table has either a 1:1 or 1:N cardinality relationship with the child base table. The parent table and the child base table may be referred to herein as being correlated, and the child base table referenced in the subquery expression may be referred to herein as a correlated-subquery table.

The 1:1 or 1:N cardinality relationship between a parent table and child table of a JSON Duality View corresponds to a primary-foreign key relationship defined by a database dictionary of a DBMS. Such primary-foreign key relationships are referred to herein as registered primary-foreign key relationships. A registered primary-foreign key relationship specifies a primary key in a table and a foreign key in another table.

A parent table has a 1:N cardinality relationship with a child table when a single record in a parent table corresponds to one or more records in a child table. The 1:N cardinality relationship applies to array fields; child fields of the array field have base attributes that are attributes of the child table. A 1:N cardinality relationship is based on a registered primary-foreign key relationship in which the parent table includes the primary key and the child table includes the corresponding foreign key. One record in the parent table that has a particular primary key value corresponds to one or more records in the child table that have an equal foreign key value.

With respect to a parent table and child table, the cardinality relationship may be referred to herein as a PK:FK relationship. A PK:FK relationship corresponds to a registered primary-foreign key relationship in which the parent table includes the primary key and the child table includes the foreign key.

A parent table has a 1:1 cardinality relationship with a child table when a record in the parent table corresponds to only one record in the child table. The 1:1 cardinality relationship applies to object fields; child fields of the object field have base attributes that are attributes of the child table. A 1:1 cardinality relationship is based on a primary-foreign key relationship in which the parent table has the foreign key and the child table has the corresponding primary key. One record in the parent table has a foreign key value that corresponds to only one record in the child table that has the primary key value.

With respect to a parent table and child table, the cardinality relationship may also be referred to herein as a FK:PK relationship. A FK:PK relationship corresponds to a registered primary-foreign key relationship in which the parent table includes the foreign key and the child table includes the primary key. Often, the child table may be a dimension table.

FK:PK Case—Object Field

Based on a FK:PK relationship a root table has with a child table, a JSON Duality View may be constructed for an object view schema that includes an object field, where the object field's child fields are mapped to base attributes of the child table. The child table is correlated with the root table by a subquery expression, which includes a field mapping in a json_object( ) operator expression. FIG. 3 depicts such a JSON Duality View.

Referring to FIG. 3, JDDL3 is a DDL statement for defining and creating JSON Duality View employee_jdv3. Similar to JDDL1, the view query expression of JDDL3 maps fields of root table employee to JSON fields empno and ename, among others.

In addition, the view query expression includes a subquery expression for object field dept_info. Specifically, dept_info is mapped by the view query expression to the subquery expression below.

```
SELECT json_object('deptno' value deptno, 'dname'
    value dname, 'loc' value loc)
FROM dept
WHERE dept.deptno = e.deptno.
```

Child table dept is the correlated-subquery table in the subquery expression. Table employee has a FK:PK relationship with child table dept based on foreign key e.deptno of table employee and primary key dept.deptno of table dept. The subquery expression defines a scalar subquery because it should only return at most one record from table dept. Child table dept is a correlated-subquery table in the subquery expression because (1) table dept is in the FROM clause of the subquery expression, (2) table dept attribute dept.deptno and table employee attribute e.deptno are each an operand in the subquery predicate expression dept.deptno=e.deptno, and table employee is in the FROM clause of the outer-query expression that contains the subquery expression.

The subquery expression projects a JSON object returned by the operator json_object( ). The field mapping of the operator maps the fields of the object field dept_info to base attributes of the child table dept. Specifically, fields deptno, dname, and loc are mapped to base attributes in dept having the same names, which are attributes deptno, dname, and loc, respectively.

JDV Object 301 is an example JDV object returned by employee_jdv3. In addition to including the child fields of JDV Object 101, JDV Object 301 includes JSON object dept_info as another child field of JDV Object 301. JSON object dept_info includes the child fields mapped by the field mapping of the json_object( ) operator in the subquery expression of employee_jdv3, the fields being deptno, dname and loc.

The values for the child fields of JDV Object 301 are populated from a base record of root table employee having a value for base attribute deptno of 094. Attribute deptno is the foreign key of table employee that corresponds to the primary key deptno in table dept. A registered primary-foreign key relationship is based on primary key deptno of table dept and foreign key deptno of table employee. In JDV Object 301, the field values for child fields of object field dept_info were populated from a base record in dept whose primary key deptno value 094 equaled the value of foreign key deptno in table employee.

For reasons that shall be explained, a JSON Duality View definition must map a field to the primary key of any base table. However, a foreign key of a base table need not be mapped as a base attribute to a child field.

PK:FK Case—Array Field

Based on a PK:FK relationship a root table has with a correlated child table in a subquery expression, a JSON Duality View may be constructed for an object view schema that includes an array field with child fields that are mapped to base attributes of the child table. FIG. 4 depicts such a JSON Duality View, which returns a JDV object with information from a department and a list of employees of the department.

Referring to FIG. 4, JDDL4 is a DDL statement for defining and creating JSON Duality View deptvf. The view query expression of JDDL4 maps fields deptno, type, dname, and loc to attributes in dept having the same name, which are attributes deptno, type, dname, and loc, respectively.

In addition, the view query expression includes a subquery expression for array field dept_info. Specifically, dept_info is mapped to the subquery expression

```
SELECT json_arrayagg(json_object('empno' value
    empno,'ename' value ename,'job' value job)
FROM employee e
WHERE d.deptno = e.deptno ...
```

Table employee is a correlated child table in the subquery expression. Table dept has a PK:FK relationship with table employee based on primary key deptno of table dept and foreign key e.deptno of table employee.

The json_arrayagg( ) operator is an aggregate operator that when included in a query expression, returns a JSON array with an element for each record matching predicate conditions in the WHERE clause of the query expression. An element has the value specified by the input argument of the aggregate operator, which is an SQL expression. In the case of the above subquery expression, the SQL expression evaluates to a JSON object returned by the json_object( ) operator. The field mapping of the json_object( ) operator expression maps the fields of the JSON object to attributes of the correlated child table employee. Specifically, fields empno, ename, and job are mapped to base attributes having the same attribute name in table employee, which are empno, ename, and job, respectively.

JDV Object 401 is a JDV object returned by deptvf. The child field values for deptno, dname, and loc are obtained from the one base record in table dept having a value for primary key deptno=094. The values for elements of child array field emp_info are obtained from table employee, which has foreign key deptno which corresponds to the primary key deptno in parent table dept. Array emp_info has three elements each containing values from one of three records in table employee having a value for foreign key attribute deptno=094. Each element includes an object field with fields empno, ename, and job, whose values are obtained from a respective one of the three records from base attributes with the same names.

Generalized Model for Json Duality View Implementation

According to an embodiment, JSON Duality Views are constructed according to PK:FK and FK:PK relationships of a table hierarchy that reflects an object hierarchy of an object view schema. An object hierarchy collectively represents the hierarchical relationships between parent fields and respective child fields of an object view schema, including intra-object cardinality relationships. A table hierarchy also reflects a JSON Duality View table implementation of a respective object hierarchy. FIG. 5 depicts object hierarchy and table hierarchy archetypes, which are Object Hierarchy 501 and Table Hierarchy 502.

Object Hierarchy 501 represents object hierarchies that can occur in an object view schema. An object hierarchy resembles a directed graph with at least one node at each level. The top level of the hierarchy includes a single root node O5R at the root level, which corresponds to the root object of an object view schema. Root node O5R contains child fields of the root object. A node below the root level corresponds to either an object field or an array field. Child fields of a root node may be referred to herein as a root child field or a root field. For purposes of exposition, Object Hierarchy 501 depicts a simple "one-path" hierarchy having only one node at each level.

Node O5L1 is a node at the next level L1 and is a child node of the root node O5R. Node O5L1 may be referred to herein as child node O5L1 with respect to root node O5R, which may be referred to herein as the parent of node O5L1. The child fields of node OL51 are the child fields of a corresponding array or object field in parent root node O5R. If the corresponding field is an array field, then the parent root node O5R and the array field have a 1:N cardinality relationship with the child node OR5L1. If the corresponding field is an object field, then the parent root node O5R and the object field have a 1:1 cardinality relationship with the child node OR5L1.

The node O5L2 is a node at the next level L2 and is a child node of the node O5L1. Node O5L2 may be referred to herein as child node O5L2 with respect to node O5L1, which may be referred to herein as the parent of child node O5L2. The child fields of node OR5L2 are the child fields of the corresponding array or object field in parent node O5L1. If the corresponding field is an array field, then the parent node O5L1 and the array field have a 1:N relationship with the child node O5L2. If the corresponding field is an object field, then the parent node O5L1 and the object field have a 1:1 relationship with the child node OR52.

A Table Hierarchy 502 represents a parent-child table arrangement of an object hierarchy for a JSON Duality View. For a JSON Duality View defined by a view query expression, one or more child tables are each a correlated subquery table in a corresponding subquery expression. A table hierarchy includes a table for each node in an object hierarchy. A table at a level corresponds to a node at the level in an object hierarchy; the table includes base attributes for the scalar child fields of the corresponding node in the object hierarchy.

A table hierarchy includes a root table at the root level and corresponds to the root node and root object of an object hierarchy. Table Hierarchy 502 includes root table T5R. The root table T5R corresponds to root node O5R and is a base table for scalar child fields of root node O5R.

At the next level L1 is a base table T5L1. It includes the base attributes for corresponding node O5L1. In a JSON Duality View defined by a view query expression, base table T5L1 is referenced in a subquery expression nested within a main outer-query expression of the view query expression that references root table T5R, which is correlated with base table T5L1. Base table T5L1 is a child table of root table T5R, which may also be referred to as the parent table of child base table T5L1.

At the next level L2 is a base table T5L2. It includes the base attributes for scalar child fields of corresponding node O5L2. In a JSON Duality View defined by a view query expression, base table T5L2 is referenced in a subquery expression nested within a subquery expression that references base table T5L1, which is correlated with base table T5L2. Base table T5L2 is a child table of base table T5L1, which may also be referred to as the parent table of child base table T5L2.

Tables in a table hierarchy have either a PK:FK or FK:PK relationship based on a registered primary-foreign key relationship. If, within an object hierarchy, the intra-object cardinality relationship between parent and child nodes to which a parent and child table correspond is 1:1, then the parent and child table have a FK:PK relationship. If the intra-object cardinality relationship between the parent and child nodes to which a parent and child table correspond is 1:N, then the parent and child table have a PK:FK relationship.

As mentioned previously, Object Hierarchy 501 and Table Hierarchy 502 are each depicted as a simple "one-path" hierarchy having only one node at each level. However, at any level below the root level, an object hierarchy and table hierarchy may have multiple child nodes and tables. For example, in an object hierarchy for an object view schema having a root array field and a root object field, the root node has two child nodes, one representing the array field and the other representing the object field. The table hierarchy includes a base table for each of the two child nodes; the base tables are child tables of a root table.

Example Three Table Json Duality Views

Example three table JSON Duality Views are described below that, for purposes of exposition, implement an object hierarchy and table hierarchy that have a single path. A path, as the termed is used herein, is a sequence of nodes in one or more parent-child relationships as described above, with one node at each level. A single-path object hierarchy and table hierarchy may be represented using a path notation as illustrated below.

Below is a path notation for employee_jdv3 shown in FIG. 3.

EMPLOYEE→{DEPT}

The path notation refers to the tables in a table hierarchy, starting with a root table in parent-child order. An arrow connects a parent table and a child table in a PK:FK or FK:PK relationship. The arrow is referred to as a cardinality vector and points to the table that has the primary key in the relationship.

Brackets surrounding a table name are used to specify that the table is a base table for the scalar child fields contained in an array field. Thus JSON Duality View deptvf, described in FIG. 4, may be represented as follows:

DEPT←[EMPLOYEE]

Three tables employee, project, and project_assignment are used to illustrate various JSON Duality Views that may be implemented by varying the root table. The example arrangements use a different root table among these three tables. Table project_assignment includes foreign key attributes empno and projectno, for which the corresponding primary keys of the same name are in tables employee and project tables, respectively.

The first example is view employee_view, which is represented by the below notation. It returns a JDV object with information about an employee's assigned projects.

EMPLOYEE←[PROJECT_ASSIGNMENT]→{PROJECT}

FIG. 6 depicts JDV Object 601, which is an example of a JDV object returned by employee_view. JDV Object 601 includes, as root child fields of JDV Object 601, scalar fields empno and ename, and array field assigned_projects. The elements of the array field each contain, as child fields, scalar child fields ass_eid and ass_projid and object field proj_info. The object field proj_info includes, as child fields, the scalar fields projid and projname.

If JSON Duality View employee_view were defined by a view query expression, table employee is both the root table and a parent table that is correlated with child table project_assignment. The correlated attributes are empno in table employee and ass_eid in table project_assignment. The base table for the scalar root child fields of JDV Object 601 is table employee. The base table for the child scalar fields of array field assigned_projects is table project_assignment.

In the view query expression, the first outermost subquery expression includes a second subquery expression for object field proj_info. With respect to the second subquery expression, project_assignment is a parent table and is correlated with child table project in the second subquery expression. The correlated attributes are projno in table project_assignment and projno in table project. The base table for the child scalar fields of object field proj_info is table project.

FIG. 6B depicts an Object Hierarchy 611 and Table Hierarchy 612 for employee_view, which has nodes in each of the three levels. In object hierarchy 611, the root node includes three child fields, scalar fields empno and ename and array field assigned_projects. Array field assigned_projects is the parent of the child node at level L1. This node includes the child fields of assigned_projects, which are scalar fields ass_eid and ass_projid and object field proj_info{ }. Object field proj_info { } is a parent of the child node at level L2. This node includes the child fields of proj_info{ }, which are projid and projname.

In table hierarchy 612, the root table is table employee and attributes empno and ename of table employee are base attributes for scalar child root fields empno and ename. The child table of the root table at level 1 is base table project_assignment and includes base attributes ass_eid and ass_projid of base table project_assignment. Base attributes ass_eid and ass_projid are base attributes of child scalar fields ass_eid and ass_projid of array field assigned_projects.

Base table project_assignment is a child table of root table employee. The correlated attributes are empno and ass_eid of tables employee and project_assignment, respectively.

The child node at level L2 includes base table project and base attributes projid and projname of base table project. Base attributes projid and projname are base attributes of child scalar fields projid and projname of object field proj_info.

A foreign key that is correlated need not be mapped to a field in an object view schema.

Example Project_View

The second example is view project_view, which is represented by the below notation. It returns a JDV object with information about a project and assigned employees.

PROJECT←[EMPLOYEE_PROJECT_ASSIGNMENT→{EMPLOYEE}]

JDV Object 602 is an example of a JDV object returned by JSON Duality View project_view. JDV Object 602 includes child scalar fields projid and projname and array field assigned_employees, the elements of which each contain child scalar fields (of the array field) ass_eid and ass_projid and child object field employee_info. Object field employee_info includes scalar field empno and ename.

In the JSON Duality View project_view, table project is both the root table and a parent table that is correlated with child table project_assignment. The root table for the scalar root child fields of JDV Object 602 is table project. The base table for the child scalar fields of array field assigned_projects is table project_assignment.

Table project_assignment is a parent table and is correlated with child table employee. The respective correlated attributes are ass_eid in table project_assignment and empno in table employee. The base table for the child scalar fields of object field employee_info is table project.

Record Set Hierarchy

The base record sets of a JDV object comprise a hierarchy of record subsets referred to herein as a base record set hierarchy. The base record set hierarchy mirrors the table hierarchy of the respective JSON Duality View of the JDV object. The root record subset is at the root level of the hierarchy and comprises one record from the root table. Each level thereafter in the record set hierarchy comprises one record subset for each base table at the same level in the respective table hierarchy. A child base table that corresponds to a "child" record subset has a cardinality relationship with a "parent" record set that the child base table has with its parent base table.

FIG. 7 depicts a Base Record Set Hierarchy 702 generated for JDV Object 601 of JSON Duality View employee_view. Because Table Hierarchy 612 is the table hierarchy for employee_view, Base Record Set Hierarchy 702 mirrors Table Hierarchy 612 and is also depicted in FIG. 8.

Referring to FIG. 7, Base Record Set Hierarchy 702 includes Root Record Subset R70, Record Subset L71, and Record Subset L72. Root Record Subset R70 is at the root level and corresponds to root table employee in Table Hierarchy 612. Record Subset L71 is at the first Level L1 of Base Record Set Hierarchy 702 and corresponds to base table proj_assignment. Record Subset L72 is at the second Level L2 and corresponds to base table proj. Mirroring the parent-child relationships of their respective base tables, Record Subset L71 is a child of root Record Subset R70 and Record Subset L72 is a child of Record Subset L71.

Root Record Subset R70 includes one record from the root table employee. Record Subset L71 includes three records from base table proj_assignment. Root Record Subset R70 and Record Subset L71 have a PK:FK ("1:N") relationship. Accordingly, Record Subset L71 includes three records from base table proj_assignment for the one root record in record subset R70. Record Subset L71 and Record Subset L72 have a FK:PK ("1:1") relationship. Accordingly, Record Subset L72 includes three records from base table project, one for each record in record subset L71.

Multi-Table Version Signatures

As mentioned before, a JDV object is returned by executing a database statement that references a respective JSON Duality View. During compilation, the database statement is rewritten based on a JSON Duality View to access data for the JDV object from base attributes of the base record set of the JDV object.

According to an embodiment, version signatures are generated by rewriting a database statement to invoke version signature functions recursively within the database statement. The version signature functions are invoked recursively by implementing a base version signature invocation that invokes version signature functions as input arguments, which in turn may invoke version signature functions as input arguments. A version signature function returns a particular type of signature generated using a hashing algorithm against a particular type of input. Input arguments for version signature functions include (1) invocation of another base signature, which returns a signature, (2) base attributes of a base table, (3) and an object or array field name.

FIG. 8 depicts version signature functions in an embodiment of the present invention. In particular, FIG. 8 depicts version signature function record_sig( ), aggr_sig( ), obj_sig( ).

Record_sig( ) returns a record signature for a record. Record_sig( ) generates a record signature based on input comprising one or more base attribute values of a record or one or more attribute input arguments.

Object_sig( ) returns an object signature. There are several ways object_sig( ) can be invoked. First, an invocation of object_sig( ) can have as input arguments one or more record signatures returned by record_sig( ) and/or object signatures returned by object_sig( ) Second, object_sig( ) can include a parameter for an object or array field name and an object signature returned by object_sig( ) as an input argument.

Aggr_sig( ) returns an array signature. Aggr_sig( ) is used to generate signatures for array fields. The input to aggr_sig ( ) is a set of signatures comprising object signatures returned by object_sig( ) and/or record signatures returned by record_sig( ). The set of signatures each corresponds to an element of an array field.

A version signature for a JDV object is an object signature returned by a single base invocation of object_sig( ), except as described later. In general, a database statement is rewritten such that arguments of the single base invocation of object_sig( ) are other invocations of version signature functions, which may make additional invocations of version signature functions in a similar fashion.

The invocations are constructed such that invocations form an invocation hierarchy that reflects the object hierarchy of the JSON Duality View. The invocation hierarchy stems from a base object_sig( ) invocation. Below the level of the base signature function invocation, the invocation hierarchy includes one or more levels, where each level comprises a set of invocations of a version signature function that corresponds to a node at a respective level in the object hierarchy; the one or more invocations are input arguments to a version signature invocation in the level above within the invocation hierarchy. For each node at a particular level in the object hierarchy, at a respective level of the invocation hierarchy, there may be a (1) row_sig( ) invocation based on the base attributes of the node's scalar child fields, (2) an object_sig( ) invocation for each object_ field( ) of the node, and (3) an array_sig( ) invocation for each array field of the node.

A goal of version signature generation is to generate version signatures in a way that is deterministic. To be deterministic, version signatures for instances of the same JDV object should match if the values of the base attributes of the respective base record sets of the instances remain the same. In addition, the base records that belong to each record subset should remain the same. If any value of a base attribute is different between respective base record sets, the version signatures should differ. In an embodiment, if corresponding record subsets of the instances contain different base records, then the version signatures differ.

Illustrative Rewrite for Version Signature Functions

To illustrate how a version signature is generated through database statement rewrites with version signature functions, a rewrite of the following database statement JQB is described. Refer to FIG. 3 for the definition of employee_jdv3. The statement requests a version signature of a JDV object returned by employee_jdv3.

JQB=SELECT VSTAG FROM employee_jdv3

Figure 9:
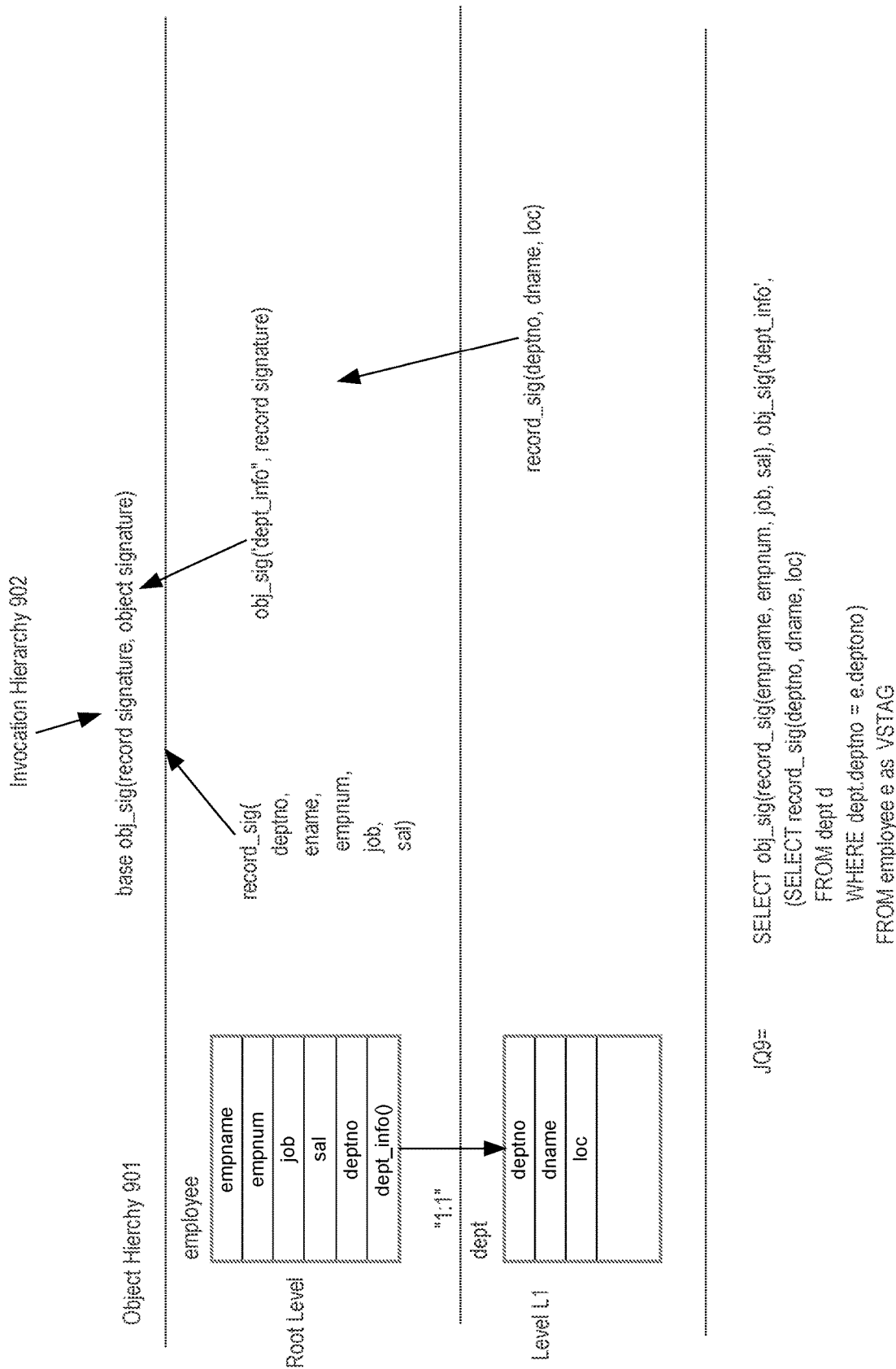
FIG. 9 depicts an invocation hierarchy of version signatures and a corresponding object hierarchy, according to an embodiment of the present invention.

FIG. 9 illustrates JQ9, a rewritten version of JQB constructed using version signature functions. FIG. 9 also depicts Object Hierarchy 901, which is the table hierarchy of employee_jdv3, and Invocation Hierarchy 902, which represents the invocation hierarchy represented from JQ9.

Referring to FIG. 9, Invocation Hierarchy 902 includes at the base level of the Invocation Hierarchy 902 a base object_sig( ) invocation. At the next level of the Invocation Hierarchy 902 that corresponds to the root level of table hierarchy 901, are version signature functions invocations that are input arguments of the base object_sig( ) invocation. These version signature functions include a record_sig( ) invocation, which includes as input arguments the base attributes of root table employee for the root scalar child fields. Also included is an obj_sig( ) invocation for the object root field dept_info, for which the child table dept is the base table.

At the next level of the Invocation Hierarchy 901, which corresponds to Level L1 of Object Hierarchy 901, is an invocation of record_sig( ) which is an input argument of the base object_sig( ) invocation. The input arguments of record_sig( ) are the base attributes of child table dept, which are the base attributes for the scalar child fields of object field dept_info.

In JQ9, the SELECT clause of the main outer-query expression includes the base object_sig( ) invocation and input version signature function invocations that correspond to the root level of Object Hierarchy 901, which are invocations of record_sig( ) and obj_sig( ). The subquery expression of JQ9 is an input argument to the obj_sig( ) invocation in the main outer-query expression. The subquery expression projects a recordsig( ) invocation corresponding to the lowest level of the table hierarchy.

Illustrative Rewrite for Array Fields

To illustrate how a version signature is generated through database statement rewrites for JDV objects with an array field, a rewrite of the following database statement JQC is described. The database statement requests the version signature of JDV Object 401 by specifying the JDV object identifier for JDV object 401 in a predicate. Refer to FIG. 4 for the definition of deptvf.

JQC=SELECT VSTAG from DEPTVF

WHERE JVDOID="59XF45"

Figure 10:
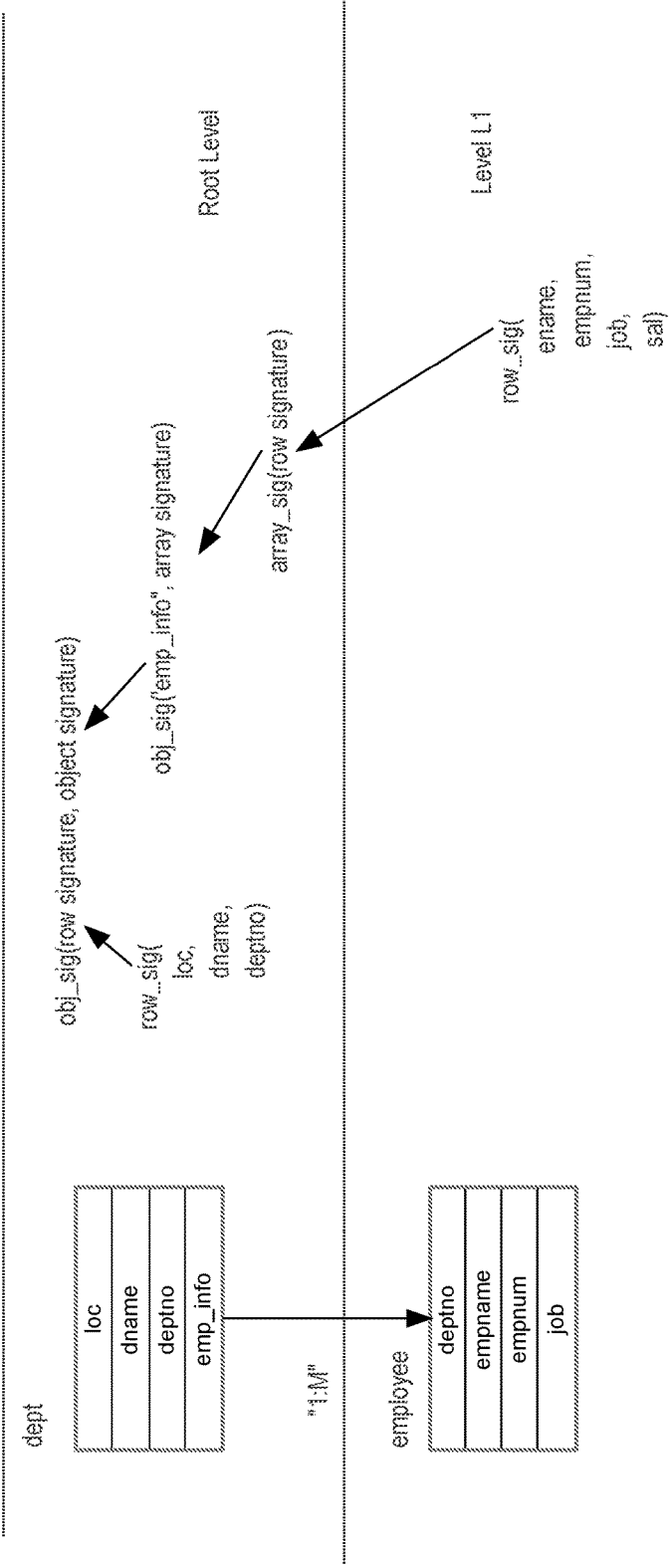
FIG. 10 depicts an invocation hierarchy of version signatures and a corresponding object hierarchy, according to an embodiment of the present invention.

FIG. 10 illustrates JQ10, a rewritten version of JQC constructed using version signature functions. Also depicted is Object Hierarchy 1001 of JSON Duality View deptvf and Invocation Hierarchy 1002, which represents the invocation hierarchy of base signatures that is represented by JQ10.

Referring to FIG. 10, Invocation Hierarchy 1002 includes at the top level of the invocation hierarchy a base object_sig( ) invocation. The next level of Invocation Hierarchy 1002 corresponds to the root level of object hierarchy 1001. This level includes a record_sig( ) invocation having input arguments that are base attributes of root table dept. Also included at this level is an obj_sig( ) invocation with array_sig( ) as an input argument. The obj_sig( ) invocation is a wrapper for the array_sig( ) to include the field name of the corresponding array field emp_info. The field name is used to compute an object signature, as shall be explained later.

Array_sig( ) generates a signature array from base records from employee that respectively correspond to an element in array field employee_info. The input argument of the array_sig( ) invocation is an invocation of record_sig( ) at the next level L1. The input arguments of record_sig( ) are the base attributes of table employee, that is, the base attributes for the child fields of array field emp_info.

In JQ10, the SELECT clause of the main outer-query expression includes the version signature functions that correspond to the root level of object hierarchy 1001. The subquery expression of JQ10 is an input argument to the obj_sig( ) invocation in the main outer-query expression. The subquery expression projects an array_sig( ) invocation, which also corresponds to the root level of object hierarchy 1001. The invocation of record_sig( ) in the subquery expression corresponds to level L1 of object hierarchy 1001.

Array_sig( ) behaves as an aggregate function similarly to how the json_arrayagg( ) operator behaves. When included in a query expression, the array_sig( ) returns a signature generated for record signatures generated for the respective table records that match the predicate condition of the query expression. The record signatures are generated by invoking the record_sig( ) on each of the records using the input arguments as previously described.

Database statement JQC is an example of a database statement that may be used to generate a version signature for a JDV object by identifying the JDV object identifier in a predicate expression. In an embodiment, when a version signature is referred to as being generated by a DBMS for a JDV object, a DBMS executes a database statement such as JQC that requests a version signature (e.g. VSTAG field) for the JDV object and identifies the JDV object using a predicate expression on a JDV object identifier (e.g. equality comparison between JVOID field and a JDV object identifier). The database statement may be a previously compiled database statement, the compilation involving rewriting the database statement using version signature functions, such as illustrated by JQ10.

Ordering Inputs of a Version Signature Function

According to an embodiment, record_sig( ) and object_sig( ) generate signatures by applying input argument values in an order. The input argument values, if applied in a different order, generate different signatures for the same set of input argument values. In order for a version signature to be generated deterministically for multiple copies of a JDV object, the invocation hierarchy for each copy should apply the input arguments of record_sig( ) and object_sig( ) in the same order. Therefore, the input arguments are applied according to an ordering scheme.

For record_sig( ), the ordering scheme is to generate a record signature by applying the attribute values for the attribute arguments in order of attribute name. For object_sig( ), if an input argument is an invocation of record_sig( ), the record signature returned by the invocation is applied first before applying an object signature returned by an input argument invocation of an obj_sig( ) or array_sig( ). Object_sig( ) can only accept one invocation of a record_sig( ) as an input argument.

If an object_sig( ) invocation includes multiple input invocations of object_sig( ), each object_sig( ) input invocation should itself include an input argument specifying a field name of an object field or array field corresponding to the obj_sig( ) invocation. For example, the below the object_sig( ) invocation is used for a JSON Duality View that represents a person and their delivery and billing addresses, the addresses being represented by object fields.

obj_sig(record_sig( fname, lname),
   obj_sig("del_addr", record_sig(....),
   obj_sig("bill_addr", record_sig(...))

The calling obj_sig( ) invocation applies the record signature for record_sig( ) first, followed by the object signature returned for object field bill_addr and then for del_addr.

If the object_sig( ) invocation includes more than one object_sig( ) and array_sig( ) input invocation, then any array_sig( ) input invocation should be wrapped in a calling obj_sig( ) that specifies the field name of the respective array field. For example, the below object_sig( ) invocation is used for a JSON Duality View that represents a person, their current address, and previous addresses. The current address is represented by an object field, and each of the previous addresses is represented by an array of address fields.

obj_sig(record_sig( fname, lname),
   obj_sig("cur_address", record_sig(....),
   obj_sig("prev_addresses", array_sig(record_sig(...)))

An array_sig( ) invocation applies a set of record signatures generated for base records from a corresponding base table. For multiple copies of a same JDV object returned by a JSON Duality View, the same set of record signatures may be generated but in a different order. If the same set of signatures is generated but in a different order, then the underlying base attributes of base records from which the record signatures are generated may not have changed. To reflect this fact, arr_sig( ) is configured to generate an array signature "commutatively", that is, generate an array signature for a set of signatures such that the order of the signatures set is irrelevant to the resultant version signature.

Finally, not all base attributes are used as input to a record signature function. A JSON Duality View may define base attributes to exclude from version signature generation. For a JSON Duality View, the set of base attributes that is used as input to version signature functions may be referred to as a version signature schema with respect to the JSON Duality View. Base attributes to exclude may be defined by annotating a view query expression to indicate that the base attribute is to be excluded from the version signature schema, similar to the way change permissions may be declared for base attributes, as described later.

Illustrative Rewrite for Entire JDV Object with VSTAG

Generating version signatures by rewriting database statements using version signature functions has been illustrated by rewriting database statements that request only a VSTAG field. As mentioned before, a JDV object returned from a JSON Duality View automatically includes a VSTAG field containing a version signature. FIG. 11 depicts a database statement rewritten to return an entire JDV object with a VSTAG field in a multi-table JDV object.

Referring to FIG. 11, database statement JQ11 requests JDV objects from JSON Duality View deptvf (see FIG. 4). Based on the definition of deptvf, a DBMS rewrites database statement JQ11 to database statement JQ11'.

Section 1102 is the portion of JQ11' constructed to generate a version signature for the JDV object returned by JSON Duality View deptvf. Section 1102 maps field VSTAG to a base object_sig( ) invocation. The invocation of array_sig( ) is not wrapped within an invocation of object_sig( ) because a field name is not required.

The base obj_sig( ) invocation is wrapped within an invocation of snapshot_sig. Snapshot_sig( ) appends a snapshot time to a version signature. Snapshot_sig( ) is optional. The snapshot time enables a version signature to be regenerated using a snapshot query associated with the snapshot time. A snapshot query is computed to reflect the state of the database at a snapshot time associated with the query.

Pessimistic Locking

According to an embodiment, pessimistic concurrency control is used to provide transactional consistency for updating a JDV object. Under pessimistic concurrency control, before a database transaction modifies any part of a JDV object, the database transaction issues a record lock on all base records in a base record set to prevent modifications to any base record in the set that may need to be changed. Issuing locks in this way before attempting to modify any base record of a JDV object is referred to herein as pessimistic locking of the JDV object.

A database transaction having a lock on a record prevents other database transactions from obtaining a lock on the record, thereby preventing any of the other database transactions from also modifying the record until the database transaction releases the lock. The database transaction releases the record locks when the database transaction terminates by committing or aborting.

Pessimistic concurrency control is used to execute a database transaction in response to receiving a select-for-update database statement. The below database statement JQD is a select-for-update statement issued by a database transaction to DBMS 100 to pessimistically lock JDV Object 601, whose base record set is Base Record Set Hierarchy 702.

JQD=SELECT obj FROM employee_view WHERE obj.empno=34 FOR UPDATE

Holding record locks on a base record set is not sufficient by itself to prevent other database transactions from changing a JDV object while those locks are held. Without a measure preventing otherwise, it is possible that a database transaction can insert a record to a child base table of the JDV object, where the inserted record would belong to a child record set corresponding to the child base table and where a correlated foreign key value of the child base table equals that of the child record set. For example, while a database transaction has all base records in Record Subset L71 locked, another database transaction can add another record to proj_assignment where the correlated foreign key ass_eid=34, thereby adding another base record to Record Subset L71 and modifying the content of JDV Object 601.

To prevent insertion of a record into a JDV object's child base table that has a correlated foreign key value that can change the content of a JDV object while a database transaction has the current base records pessimistically locked, a database transaction issues a foreign key value lock on the child base table to a DBMS. Foreign key value locks are issued on any correlated foreign key of a child table that is correlated with the parent table's primary key.

An example of a mechanism for foreign key value locking is a foreign key index lock. A foreign key index is an index on a foreign key of a registered primary-foreign key relationship. A foreign key value locks index entries for that foreign key value, thereby preventing the inserting or deleting of records having that foreign key value or the updating of the foreign key in records to or from that foreign key value.

Consistent Read and Current Read

There are various capabilities that are important to optimistic serialized updating. These are (1) consistent read mode and (2) current read mode, (3) object disassembly, and (4) delta record set generation. Consistent read and current read are modes of executing database commands and database operations that are related to transactional consistency.

Object disassembly in effect reverse engineers a JDV object into a logical base record set, in other words, object disassembly extracts and derives a base record set from a JDV object. The base record set is referred to herein as a derived record set. Delta record set generation compares a derived record set to a base record set generated from the database for a JDV object to determine differences between the two. The differences are represented by a delta record set. Because these capabilities are important to optimistic serialized updating, a description of these capabilities is provided herein before describing optimistic serialized updating.

In consistent read mode, reads of database data during execution of one or more database statements by a database transaction returns data that is consistent with an SCN (system change number) associated with the database transaction. The SCN is referred to herein as a snapshot time. Transactional consistency requires that reads reflect only transactions committed before the SCN and any uncommitted database changes made by the database transaction.

In transaction processing in a DBMS, changes made by database transactions to records entail changes to data blocks that store data for the records. These changes are recorded in change records, which may include redo records and undo records. Redo records may be used to reapply changes made to a data block by a database transaction. Undo records are used to reverse or undo changes made to a data block by a transaction.

Undo records are used to provide transactional consistency by performing operations referred to herein as "consistent-read operations". Each undo record is associated with a SCN. For data blocks that are read for a database statement, a DBMS applies the needed undo records to copies of the data blocks to bring the copies to a state that is consistent with the snapshot time of the database statement. The DBMS determines which undo records to apply to a data block based on the respective SCNs associated with the undo records. The term consistent-read operations refers to operations performed on database data to ensure the data is consistent with a snapshot time. Such operations include applying undo records to data blocks as described previously. Another example of a consistent-read operation is examining transaction metadata in a data block to determine whether data in the data block is or is not transactionally consistent with the SCN time. Applying a undo record to the data block may be performed in response to a determination that the data block is not transactionally consistent with the snapshot time.

In current read mode, read operations reflect uncommitted changes to data blocks. Consistent read operations are not performed. For example, a data block contains an uncommitted record in a table having a particular foreign key value. The uncommitted record is inserted by a database transaction that has not been committed. Before the database transaction commits, another database transaction operating in current mode reads the data block containing the uncommitted record. The database transaction is executing a query that filters records based on the foreign key value. When the database transaction reads the data block, consistent read operations are foregone, and as a result, the database transaction reads the uncommitted record. If the foreign key is indexed by a foreign key value index, then the database transaction is also able to read a data block storing an index entry for the record in the foreign key value index.

Object Disassembly

Object disassembly extracts a derived record set from a JDV object based on the respective JSON Duality view's mappings of base attributes and tables. In effect, the derived record set is generated according to the respective object hierarchy and table hierarchy of the JSON Duality View.

Like a base record set, a derived record set is comprised of a hierarchy of record subsets with parent-child relationships as described previously for a base record set hierarchy. For each level in a table hierarchy, and for each base table at that level, at least one derived record is generated having the base attributes of the base table for the object view schema fields that correspond to the base table; a base attribute has the respective scalar value of the corresponding field.

A derived record includes base attributes required by a JSON Duality View. Thus, a derived record may not include all attributes of the corresponding base table. Hence, derived records are referred to herein as being skeletal.

If the base table corresponds to an array field, then the derived record subset includes a derived record for every element in the array field, the derived records having the base attributes that correspond to respective scalar child fields of the array field. For each element, the corresponding derived record includes the scalar field values for the respective base attribute.

If at a level, a base table is a child table of a parent that is a base table for an array field, then the base table corresponds to a child object field of the array field. The derived record subset for the child table includes a derived record for each element, the derived records having the base attributes from the child table that correspond to respective scalar child fields of the array field.

Delta Record Set Generation

Delta record set generation generates a delta record set that comprise one or more delta tuples by comparing a derived record set of a JDV object to a base record set that was generated for the JDV object from the database. A derived record in a derived record set may be a version of a same record in the base record set; the record in the derived records and the base record in the base record set are referred to herein as counterparts or collectively as a counterpart set. A delta tuple and a base record that belong to a counterpart set contain the same primary key value.

As mentioned previously, a JSON Duality View must map a JSON field to any primary key of any base table of the JSON Duality View. As a consequence, a derived record has the same primary key value as its counterpart base record. Counter-part records are identified by finding a derived record and a base record with a same primary key value. Logically, counterpart records are the same record but may be different versions of the record.

A delta tuple represents either (1) a set of changes or deltas between records in a counterpart set, (2) a base record deleted from a base record set or a base record inserted into the base record set. Delta tuples include base attributes and values and are marked to specify changes represented by the delta tuple if any.

For each counterpart set, a delta tuple is generated and populated with same base attribute value as that of the respective derived record. The base attribute values in the delta tuple are then compared to base attribute values in the respective base record of the counterpart set. If a base attribute value in the delta tuple does not match the corresponding base attribute value in the respective base record, the base attribute in the delta tuple is marked as changed and the delta tuple is also marked as changed. If there are no differences between corresponding base attributes, then the delta tuple is marked as unchanged.

If a derived record has no counterpart, then a delta tuple is generated that represents an insert of a base record to the respective base table of the derived record. The delta tuple is marked as "addition" and populated with the same base attribute values as that of the derived record.

If a base record has no counterpart, then a delta tuple is generated that represents a delete of a base record to from its base table. The delta tuple is marked as "deletion" and populated with the same attribute values as that of the base record.

A derived record set may contain duplicate derived records for a same base record. In this case, a counterpart set includes multiple derived records and the base record. For each set of duplicates, only one delta tuple is generated that consolidates the changes represented by the duplicates. For example, if a derived record indicates a change to one attribute and another derived record indicates a change to another attribute, then a single delta tuple is generated that specifies the change to both attributes. If derived records in a counterpart set indicate conflicting changes, e.g. indicate different changes to the same base attribute, then an error is generated.

Optimistic Serialized Updating

Figure 12:
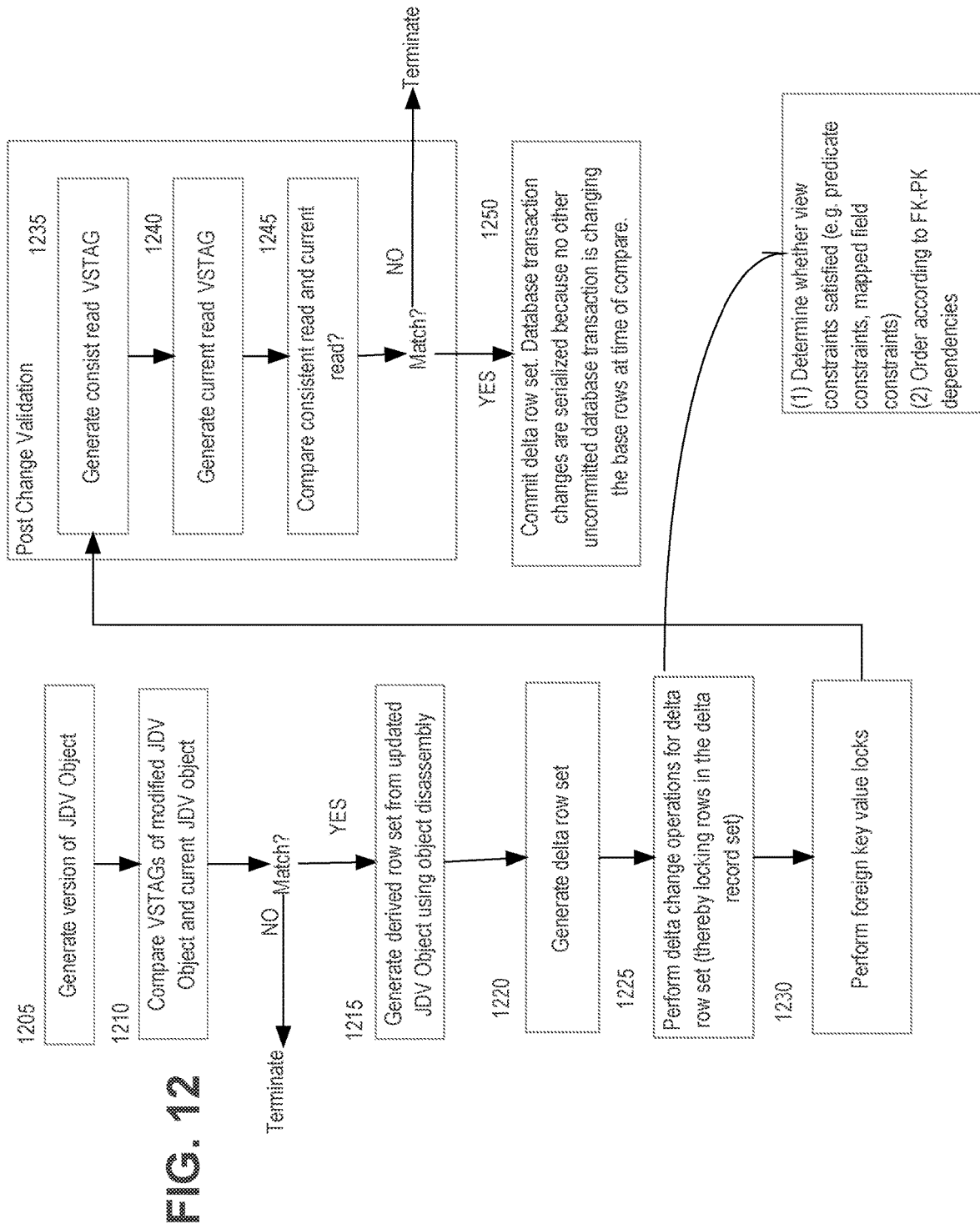
FIG. 12 depicts a flow chart depicting optimistic serialized updating, according to an embodiment of the present invention.

FIG. 12 is a flowchart depicting a process using optimistic serialized updating of a JDV object. Optimistic serialized updating can be performed in response to an UPDATE statement identifying the JDV object to update using a JDV object ID and a modified version of the JDV object to which to set the JDV object, as follows:

UPDATE deptvf SET object=myJDVO
    WHERE object.JVDOID=myJDVO.JVDOID

Compiling and executing an UPDATE statement entails more steps performed than are depicted in FIG. 12. FIG. 12 describes steps that are pertinent to enabling optimistic serialized updating. The update statement is executed by a database transaction having a snapshot SCN referred to herein as the current snapshot SCN. The database transaction is executed in the consistent read mode except as described below.

Referring to FIG. 12, a current version of the JDV object is generated. The base record set generated for the JDV object is stored as the current base record set. (1205)

Next, respective VSTAGs of the updated JDV object and the current version are compared. (1210) If the VSTAGs match, then the DBMS determines that the modified JDV object does not represent an update to the current version of the JDV object. The procedure is terminated. This step is referred to herein as the pre-update version check.

If it is determined that the VSTAGs match, then object disassembly is performed to generate a derived record set. (1215) Next, a delta record set is generated based on the derived record set and the current base record. (1220)

Next, "delta change operations" are performed. Delta change operations only change base records that correspond to delta tuples representing a modification, deletion or addition of a base record of a base table of the JSON Duality View. In an embodiment, this step entails, for each delta tuple, determining whether the delta tuple represents a change to a base record, and if so, generating a change operation for the change. A change operation may be generated by issuing a DML command effecting the change. An UPDATE command is issued for a delta tuple representing a change to a base record using the primary key value in the delta tuple to identify the base record; the UPDATE command only updates an attribute marked as changed in the delta tuple. INSERT commands are issued for a delta tuple marked as addition; the statement specifies attributes values specified in the delta tuple.

Delta change operations are ordered and checked to ensure constraints imposed by the primary-foreign key relationships and the JSON Duality View definition are not violated, as shall be described in further detail later.

Issuing an UPDATE and DELETE statement against a base record lock causes a DBMS to issue a lock on the record. Often there may be many base records in the current base record set for which a DML command is not generated at this step. The effect of not locking all the base records results in less records being locked. Less record locking decreases lock contention and rework by database transactions thereby improving system performance of a DBMS. The increase in system performance arising from decreased lock contention is even greater when compared to pessimistic locking. Not only are fewer records locked, but the locks that are issued are for a much lesser period of time.

Next, for any PK:FK relationships in the table hierarchy of the JSON Duality View, foreign key value locks are issued. (1225)

Next, "post change validation" is performed. Post change validation ensures the changes to the base records made by the delta change operations can be performed in a transactionally serial manner when the change operations are committed. In essence, this assurance is provided by determining whether there are any uncommitted changes of another database transaction to any base record of the JDV object at the time the post change validation is performed.

In consistent read mode, a version signature for the JDV object is generated. (1235) In current read mode, a version signature is generated. (1240) Next, the pair of version signatures are compared. (1245)

If the pair version signatures match, then no other database transaction is changing a base record of the JDV object, or inserting or deleting a base record that alters the content of the JDV object. The only base record changes that affect the content of the JDV object at this instance are uncommitted base record changes made by the current database transaction. Consequently, the changes to the JDV object have been made serially.

In response to determining the pair of version signatures match, the database transaction is committed. (1250) Otherwise, the database transaction is terminated.

An update to an JDV object that does not pass the pre-update version check would also not pass the post change validation. In this respect, the pre-update version check is redundant. However, the pre-update version check in effect disqualifies an update without having to incur the additional processing that occurs after the pre-update version check, such as performing delta change operations and concomitant record locking, thereby improving system performance.

Optimistic serialized updating may be performed for multiple JDV objects at a database statement level or database transaction level. At the database statement level, a delta record set is generated and delta change operations are performed for each the JDV objects. Then, post change validation is performed for each of the JDV objects. If for each JDV object the version signatures generated in the consistent read mode and the current read mode match, then the database statement is committed.

At the database transaction level, multiple database statements may be executed and multiple JDV objects changed by generating respective delta record sets and performing respective delta change operations. In response to receiving a request to commit the database transaction, post change validation is performed for each of the JDV objects. If for each JDV object the version signatures generated in the consistent read mode and the current read mode match, then the database statement is committed.

Post change checking may be applied to optimistic updating of various kinds of record sets found in various kinds of DBMSs. Various kinds record sets include, for example, a record set that comprises one or more rows, one or more XML documents, or one or more JSON object. Any implementation of post change checking requires the capability to generate the record set in consistent read mode, current read mode, and a technique for detecting differences between the two record sets deterministically, including though the use of generating version signatures deterministically based on a version signature schema.

Change Operation Validation and Change Operation Ordering

Change operation validation refers to checking whether change operations for updating a JDV object violate constraints imposed by the respective JSON Duality View. Such constraints include predicate constraints and change permission constraints. Change operation validation may be performed after delta record set generation and before post change validation.

Predicate constraints may be defined by predicate expressions in a view query expression that are not correlating predicate expressions. Such a predicate expression is referred to herein as a filter predicate expression. Change operations are checked against predicate constraints and may cause a predicate constraint error if a change operation violates a predicate constraint. For example, the view query expression for JSON Duality View deptvf (see FIG. 4) includes the following filtering predicate expression in the subquery:

e.job< >"Manager"

An update to JDV object 401 (see FIG. 4) that changes field job from "SMITH" to "MANAGER" would generate a delta tuple that specified that the updated value of attribute job is "MANAGER". During change operation validation, a DBMS determines the attribute value in the delta tuple does not satisfy the filter predicate expression e.job< > "Manager", thereby detecting a predicate constraint violation and preventing the update.

Another type of constraint is a change permission constraint defined by a JSON Duality View. As shall be explained later herein, a change permission may be declared by a JSON Duality View for a base attribute or base table. For example, a change permission declared by deptvf may bar updating base attribute job. A modification to JDV Object 401 that changes the field job from "SMITH" to "SENIOR ACCOUNTANT" generates a delta tuple that specifies the updated value of base attribute job as "SENIOR ACCOUNTANT" and marks the base attribute as changed. During change operation validation, a DBMS determines the base attribute for which the change permission is NOT UPDATABLE as defined by deptvf has been changed, thereby detecting a change permission violation and preventing the update.

Another type of constraint is a mapped field constraint. If an updated JDV object includes a field not mapped by the respective JSON Duality View, then a mapped field constraint violation is generated.

Change operations are ordered so that FK-PK dependencies are satisfied. Specifically, a record having a foreign key value has a FK-PK dependency on a record having the primary key value. If the record with the primary key value has been inserted into the database, then the dependency is satisfied; otherwise, the dependency is not satisfied. If a delta change operation inserts a particular base record and another delta change operation inserts another base record having a FK-PK dependency on the particular base record, then the change operation for the particular base record is executed before executing the delta change operation for the other base record.

Change Permission Declarations

A JSON Duality View may define change permissions by declaring a change permission in the view query expression of JSON Duality View. Change permissions may be declared by annotating a view query expression with change permission declarations. To illustrate, FIGS. 13A and 13B depict versions of DDL statements JDDL3 and JDDL4 annotated with change declarations. In FIGS. 13A and 13B, DDL statements JDDL3' and JDDL4' define JSON Duality Views employee_jdv3 and deptvf, respectively.

Referring to FIG. 13A, JDDL3' includes various change permission annotations, as follows:
1. In clause FROM dept WITH (UPDATE), the WITH (UPDATE) annotation declares that the base attributes of table employee are updatable.
2. In clause FROM dept WITH (UPDATE), the WITH (UPDATE) annotation declares that the base attributes of table dept are updatable.
3. In clause 'sal' value sal WITH (NOUPDATE), the WITH(NOUPDATE) annotation declares that the base attribute sal of table employee is not updatable. Thus, a change permission declaration can be made generally for base attributes at a base table level, but may be overridden for a particular base attribute at the attribute level annotation.

Referring to FIG. 13B', JDDL4' includes the following change permission declaration:
In clause FROM employee e WITH (DELETE, INSERT, UPDATE), the WITH annotation declares that the base attributes of table employee are updatable, and that base records for table employee may be deleted or inserted. By default, there are no change permissions for base records for a child table.

Unnesting and Nesting

The FK:PK relationship between a parent table and child table has been described as being used to define an object field, the respective child fields, and base attributes. According to an embodiment, the base attributes in the child table may be used for fields that are not contained in an object field, and that are in effect "unnested" to a level up in the object hierarchy. Specifically, base attributes in a child table are mapped to fields at an object hierarchy level corresponding to the parent table of the child table. Such unnesting is effected through use of an UNNESTING clause in the view query expression of a JSON Duality View. Base attributes mapped in this way are referred to herein as unnested base attributes; fields mapped to the unnested base attributes are referred to herein as unnested object field attributes.

FIG. 14 depicts a JSON Duality View employee_jdv14 for which unnested base attributes are defined. Employee_jdv14 is similar to employee_jdv3, except that JDDL14 includes an UNNEST clause that qualifies a correlated subquery expression, the effect of which is to declare the projected attributes of the subquery as unnested base attributes for fields at the object hierarchy level of the parent table employee.

JDO1401 is a JDV object returned by employee_jdv14. All the fields in JDO1401 are at the same level of the object hierarchy, including field deptno, dname, and loc.

Base attributes of a base table can also be "nested". That is, the base attributes are mapped to child fields of an object field, the child fields being at a lower level of the object hierarchy than that of the base table. Such unnesting is effected through use of a json_object( ) operator expression that maps the base attributes to child fields of an object field. Base attributes mapped in this way are referred to herein as nested base attributes; fields that are mapped to nested base attributes are referred to herein as nested base attributes.

Simplified DDL Syntax

View query expressions for JSON Duality Views can be very complicated and very tedious to manually write and interpret. According to an embodiment, DDL statements for defining JSON Duality Views may be generated using a simplified syntax that references the tables in a way that indicates the root table and base tables along with rudimentary annotations about the object or array fields corresponding to the base tables. Based on definitions of referenced tables and registered PK:FK relationships defined in a database dictionary, a DBMS generates metadata in a database dictionary defining the JSON Duality View. By default, the attributes in a referenced table are mapped to a field according to the object hierarchy implied by the DDL statement. The DDL statement need not reference the attributes explicitly.

An example of use of a simplified syntax is DDL statement JDDL1' (see FIG. 1). The JSONIZE clause declares JSON Duality View employee_jdv1 using table employee. In response to a DBMS receiving the JDDL2', the DBMS creates JSON Duality View employee_jdv1, mapping the base attributes of table employee to fields of object view schema as shown by JDDL2.

JDDL3' is an example DDL statement using the simplified syntax to define a multi-table JSON Duality View with an object field, which is JSON Duality View employee_jdv3. The expression in the JSONIZE clause is referred to herein as the simplified table-object mapping, and is shown below:

employee ('dept_info': {DEPT})

The mapping specifies table employee as a root table and table dept as a child of root table employee and a base table for an object field, along with the name of the object field, which is dept_info. The parenthetical associated with table employee specifies that the table dept contained therein is a child table of parent table employee. The braces denote that the table dept is a base table for an object field having the specified name of the field, which is dept_info. This arrangement requires a FK:PK relationship between table employee and table department that is supported by a registered primary-foreign key relationship, one in which the primary key is the primary key of table dept and the respective foreign key is a foreign key of table employee. A DBMS examines its database dictionary to determine that there is such a registered primary-foreign key relationship, which is the registered primary-foreign key relationship between primary key deptno of table dept and foreign key deptno of table employee.

In response to this determination, the DBMS determines that attributes deptno of employee and deptno of table dept are correlated attributes for the JSON Duality View employee_jdv3 and creates JSON Duality View employee_jdv3. The determination is made without these attributes having been explicitly referenced as correlated attributes in JDDL3'.

In addition, the DBMS determines that the child fields of the object dept_info are fields deptno and dname because these are the names of the attributes of table dept, which the DBMS also determines are the base attributes for these child fields. The DBMS automatically defines that view employee_jdv3 in this way without these fields and attributes being explicitly referenced in JDDL3'.

JDDL4' is an example DDL statement using the simplified syntax to define a multi-table JSON Duality View with an array field, which is JSON Duality View deptvf. The JSONIZE clause contains the simplified table-object mapping shown below:

dept('emp_info': [employee])

The mapping specifies table dept as a root table and table employee as a child of root table employee and a base table for an array field, along with the name of the array field, which is emp_info. The parenthetical associated with table dept specifies that the table employee contained therein is a child table of parent table dept. The brackets denote that table employee is a base table for an array field having the specified name, which is 'emp_info'. This arrangement requires a PK:FK relationship between table dept and table employee that is supported by a registered primary-foreign key relationship, one in which the primary key is the primary key of table dept and the respective foreign key is a foreign key of table employee. A DBMS refers to its database dictionary to determine that there is such a registered primary-foreign key relationship, which is the registered primary-foreign key relationship between primary key deptno of table dept and foreign key deptno of table employee.

In response to this determination, the DBMS determines that attributes deptno of employee and deptno of table dept are correlated attributes for the JSON Duality View deptvf and creates JSON Duality View deptvf. The determination is made without these attributes having been explicitly referenced as correlated attributes in JDDL3'.

In addition, the DBMS determines that the child fields of the array field emp_info are fields empno, ename, and job because these are the names of the attributes of table employee, which the DBMS also determines are the base attributes for these child fields. The DBMS automatically defines that view employee_jdv3 in this way without these fields and attributes being explicitly referenced in JDDL3'.

FIG. 15A and FIG. 15B show BNF (Backus normal form) grammar for a simplified syntax for a DDL statement that define JSON Duality Views. The grammar is addressed an embodiment for a relational DBMS.

Simplified DDL Syntax—GraphQL

Another simplified syntax that may be used to define a JSON Duality View is GraphQL (see for example, GraphQL, October 2021 Edition). The DDL statement identifies a root table along with an object notation having a syntax similar to GraphQL. Using the object notation, a DDL statement defines a root object, root fields, and zero or more GraphQL object fields and respective child fields. A GraphQL object field is associated with a child table. Based on a registered parent-foreign key relationship between the child table and the respective parent table, a DBMS automatically determines whether the registered parent-foreign key relationship corresponds to a PK:FK relationship or a FK:PK relationship for the parent and child table. Based on the determination, the DBMS treats the GraphQL object field as either a JSON object field or an array field. Finally, similar to as described before, a child table for a particular GraphQL object field may also be a parent table for a child table of a nested GraphQL object field at the level below in the object hierarchy.

FIG. 16 depicts a DDL statement JDDL-GQ defining a JSON Duality View deptvfq using GraphQL. JSON Duality View deptvfq is similar to deptvf. The clause FROM dept identifies table dept as the root table.

Using braces for object notation, JDDL-GQ maps scalar root fields to attribute names of root table dept. For example, JSON field DeptNumber is mapped to attribute deptno. Using object notation, JDDL-GQ also maps the GraphQL object field Emp_info to a child table of the root table dept, which is table employee. Based on the registered primary-foreign key relationship in which table dept has the primary key deptno and table employee has the foreign key deptno, a DBMS determines that this relationship corresponds to a PK:FK relationship between the tables and therefore Emp_info is an array field. JDDL-GQ maps the child fields EmpNum and EmpName of the array field to base attributes empno and ename of table employee.

Viewing a Object View Schema

A DBMS generates output describing a view by using the DDL command DESCRIBE. The output describes details of the metadata of the view, such as a view query expression.

Users also find a description of the object view schema of JSON Duality View useful. According to an embodiment, a DBMS may generate output describing the object view schema of a JSON Duality View. According to an embodiment, a DBMS is configured to provide a function to invoke that generates a description of a JSON schema. The function takes as an argument a JSON Duality View. Alternatively, a syntax for a DDL statement that requests an object view schema may also be used.

FIG. 16 shows an example of a description of object view schema for deptvfq. The description conforms to JSON schema.

Finally, a database command submitted to a DBMS may use simplified syntax to generate query expressions similar to view query expressions. Similar to the way a JSON Duality Views is defined, a registered parent-foreign key relationship may be used to generate query expression that returns JSON objects having an array field or object field.

JSON Duality View Metadata

In response to the receiving a DDL statement defining a JSON Duality View, a DBMS generates JDV metadata that defines the view in a database dictionary. The metadata defines various aspects such as 1. Fields, field name, object hierarchy, object view schema, and table hierarchy.
2. The root table and a mapping between root fields and root attributes.
3. Mapping between base tables and base attributes to child fields of object fields and array fields.
4. Mapping between object and array fields FK:PK relationships to object and array fields, and for each FK:PK relationships, correlated attributes and tables.
5. Mapping between change permissions and base tables and attributes.
6. The version signature schema set.
7. A view query expression if the DDL statement defined the JSON Duality View using the view query expression.
8. The one or more JDV object identifier attributes, including the one or more JDV object identifiers that correspond to the primary key.

JDV metadata may be cached in volatile memory in a compile-time form. The cached JDV metadata provides quicker access to JDV metadata. The quicker access is not only accelerated by caching the metadata in lower latency volatile memory, but also by storing the metadata in a compile-time format that is organized for more efficient access by database processes that use the metadata to perform such operations as compilation.

The term correlated table and correlated attribute are used herein generally to refer to tables and attributes that are involved in a FK:PK relationship for an object field or that are involved in a PK:FK relationship for an array field. The term correlated when used with respect to a table or attribute does not limit the table and attribute to one correlated by an outer query or subquery query expression in a view query expression of a DDL statement or stored in JDV metadata. As shown above, a DDL statement may be used to define a JSON Duality View without describing a view query expression, such as a DDL statement like JDDL3'. A database statement requesting a JDV Object in a JSON Duality View may be rewritten to include a correlated subquery for an object field or array field based on mappings on the JDV metadata, including the mapping between a FK:PK relationship and an object field and a mapping between a FK:PK relationship and an array field.

JSON Duality Views Docs

JSON Duality Views and related described herein may be implemented in a DOCS. DOCS, like views in a relational DBMS, provide a view mechanism than can be adapted to map attributes of collection and tables to fields of an object view schema. DDL statements, such as the Simplified DDL Syntax, may be used to define JSON Duality Views and generate JDV metadata defining the JSON Duality Views.

A DOCS provides for primary keys for a table or collection of documents. For example, JSON documents in a collection may have an "_id" field that serves as a primary key. A collection or table of documents may also have one or more foreign keys having primary key values. A database dictionary for the DOCS may define a registered primary-foreign key relationship, which may be used to automatically generate JSON Duality View using the simplified DDL syntax described earlier.

In a DOCS in which documents are stored as JSON objects, a JSON Duality View may define a root collection and a child collection. A PK:FK relationship between the root collection and the child collection may be used to define an array field in the object view, whose correlated attributes include the primary key attribute in the root collection and foreign key attribute in the child collection. Similarly, an FK:PK relationship between a root collection and a child collection may be used to define an object field.

The base record set comprises a hierarchy of record subsets, each comprising one or more JSON objects from a respective base collection. Parent-child relationships of a parent record subset and child record subset are based on registered parent-foreign relations between the primary key and foreign key of the collections of the parent record subset and child record subset.

DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically-marked data objects; however the hierarchically-marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, views, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database statement requesting a change, such as a DML statement requesting an update, insert of a record, or a delete of a record or a CRUD object method invocation requesting to create, update or delete a document. DML statements or commands refer to statements that specify to change data, such as INSERT and UPDATE statements. A DML statement or command does not refer to a statement that merely queries database data. Committing a transaction refers to making the changes for a transaction permanent.

Under transaction processing, all the changes for a transaction are made atomically. When a transaction is committed, either all changes are committed, or the transaction is rolled back.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMS.

A two-phase commit involves two phases, the prepare-to-commit phase and the commit phase. In the prepare-to-commit phase, branch transaction is prepared in each of the participating database systems. When a branch transaction is prepared on a DBMS, the database is in "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare, or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be a computer system process or thread or a user defined execution context such as a user thread or fiber. Database processes may also include "database server system" processes which provide services and/or perform functions on behalf of the entire database server. Such database server system processes include listeners, garbage collectors, log writers, and recovery processes.

A multi-node database management system is made up of interconnected nodes each running a database server that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e. .java file) and the compiled version of the class (i.e. .class file).

Native data types are data types supported by a DBMS "out-of-the-box". Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native date types. Native data types do not have to be defined by a database dictionary to be recognized as a valid data type and to be processed by a DBMS in database statements. In general, database software of a DBMS is programmed to recognize and process native data types without configuring to the DBMS to do so, by for example, defining a data type by issuing DDL statements to the DBMS.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 17:
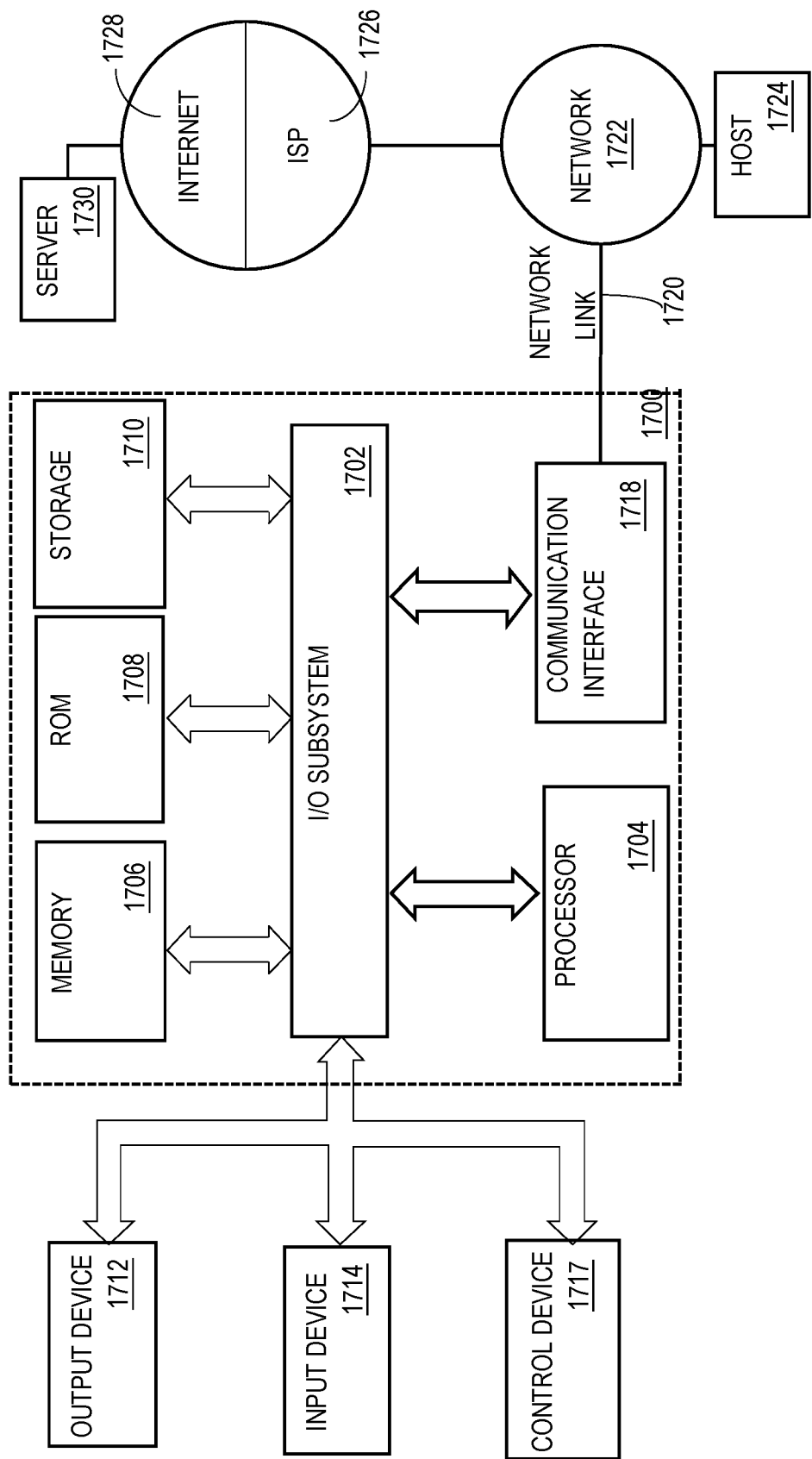
FIG. 17 depicts a computer system that may be used to implement an embodiment of the present invention.

For example, FIG. 17 is a block diagram that illustrates a computer system 1700 upon which an embodiment of the invention may be implemented. Computer system 1700 includes a bus 1702 or other communication mechanism for communicating information, and a hardware processor 1704 coupled with bus 1702 for processing information. Hardware processor 1704 may be, for example, a general purpose microprocessor.

Computer system 1700 also includes a main memory 1706, such as a random access memory (RAM) or other dynamic storage device, coupled to bus 1702 for storing information and instructions to be executed by processor 1704. Main memory 1706 also may be used for storing temporary variables or other intermediate information during execution of instructions to be executed by processor 1704. Such instructions, when stored in non-transitory storage media accessible to processor 1704, render computer system 1700 into a special-purpose machine that is customized to perform the operations specified in the instructions.

Computer system 1700 further includes a read only memory (ROM) 1708 or other static storage device coupled to bus 1702 for storing static information and instructions for processor 1704. A storage device 1710, such as a magnetic disk, optical disk, or solid-state drive is provided and coupled to bus 1702 for storing information and instructions.

Computer system 1700 may be coupled via bus 1702 to a display 1712, such as a cathode ray tube (CRT), for displaying information to a computer user. An input device 1714, including alphanumeric and other keys, is coupled to bus 1702 for communicating information and command selections to processor 1704. Another type of user input device is cursor control 1716, such as a mouse, a trackball, or cursor direction keys for communicating direction information and command selections to processor 1704 and for controlling cursor movement on display 1712. This input device typically has two degrees of freedom in two axes, a first axis (e.g., x) and a second axis (e.g., y), that allows the device to specify positions in a plane.

Computer system 1700 may implement the techniques described herein using customized hard-wired logic, one or more ASICs or FPGAs, firmware and/or program logic which in combination with the computer system causes or programs computer system 1700 to be a special-purpose machine. According to one embodiment, the techniques herein are performed by computer system 1700 in response to processor 1704 executing one or more sequences of one or more instructions contained in main memory 1706. Such instructions may be read into main memory 1706 from another storage medium, such as storage device 1710. Execution of the sequences of instructions contained in main memory 1706 causes processor 1704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1710. Volatile media includes dynamic memory, such as main memory 1706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1702. Transmission media can also take the form of acoustic or light waves, such as those generated during radio-wave and infra-red data communications.

Various forms of media may be involved in carrying one or more sequences of one or more instructions to processor 1704 for execution. For example, the instructions may initially be carried on a magnetic disk or solid-state drive of a remote computer. The remote computer can load the instructions into its dynamic memory and send the instructions over a telephone line using a modem. A modem local to computer system 1700 can receive the data on the telephone line and use an infra-red transmitter to convert the data to an infra-red signal. An infra-red detector can receive the data carried in the infra-red signal and appropriate circuitry can place the data on bus 1702. Bus 1702 carries the data to main memory 1706, from which processor 1704 retrieves and executes the instructions. The instructions received by main memory 1706 may optionally be stored on storage device 1710 either before or after execution by processor 1704.

Computer system 1700 also includes a communication interface 1718 coupled to bus 1702. Communication interface 1718 provides a two-way data communication coupling to a network link 1720 that is connected to a local network 1722. For example, communication interface 1718 may be an integrated services digital network (ISDN) card, cable modem, satellite modem, or a modem to provide a data communication connection to a corresponding type of telephone line. As another example, communication interface 1718 may be a local area network (LAN) card to provide a data communication connection to a compatible LAN. Wireless links may also be implemented. In any such implementation, communication interface 1718 sends and receives electrical, electromagnetic or optical signals that carry digital data streams representing various types of information.

Network link 1720 typically provides data communication through one or more networks to other data devices. For example, network link 1720 may provide a connection through local network 1722 to a host computer 1724 or to data equipment operated by an Internet Service Provider (ISP) 1726. ISP 1726 in turn provides data communication services through the world wide packet data communication network now commonly referred to as the "Internet" 1728. Local network 1722 and Internet 1728 both use electrical, electromagnetic or optical signals that carry digital data streams. The signals through the various networks and the signals on network link 1720 and through communication interface 1718, which carry the digital data to and from computer system 1700, are example forms of transmission media.

Computer system 1700 can send messages and receive data, including program code, through the network(s), network link 1720 and communication interface 1718. In the Internet example, a server 1730 might transmit a requested code for an application program through Internet 1728, ISP 1726, local network 1722 and communication interface 1718.

The received code may be executed by processor 1704 as it is received, and/or stored in storage device 1710, or other non-volatile storage for later execution.

Software Overview

Figure 18:
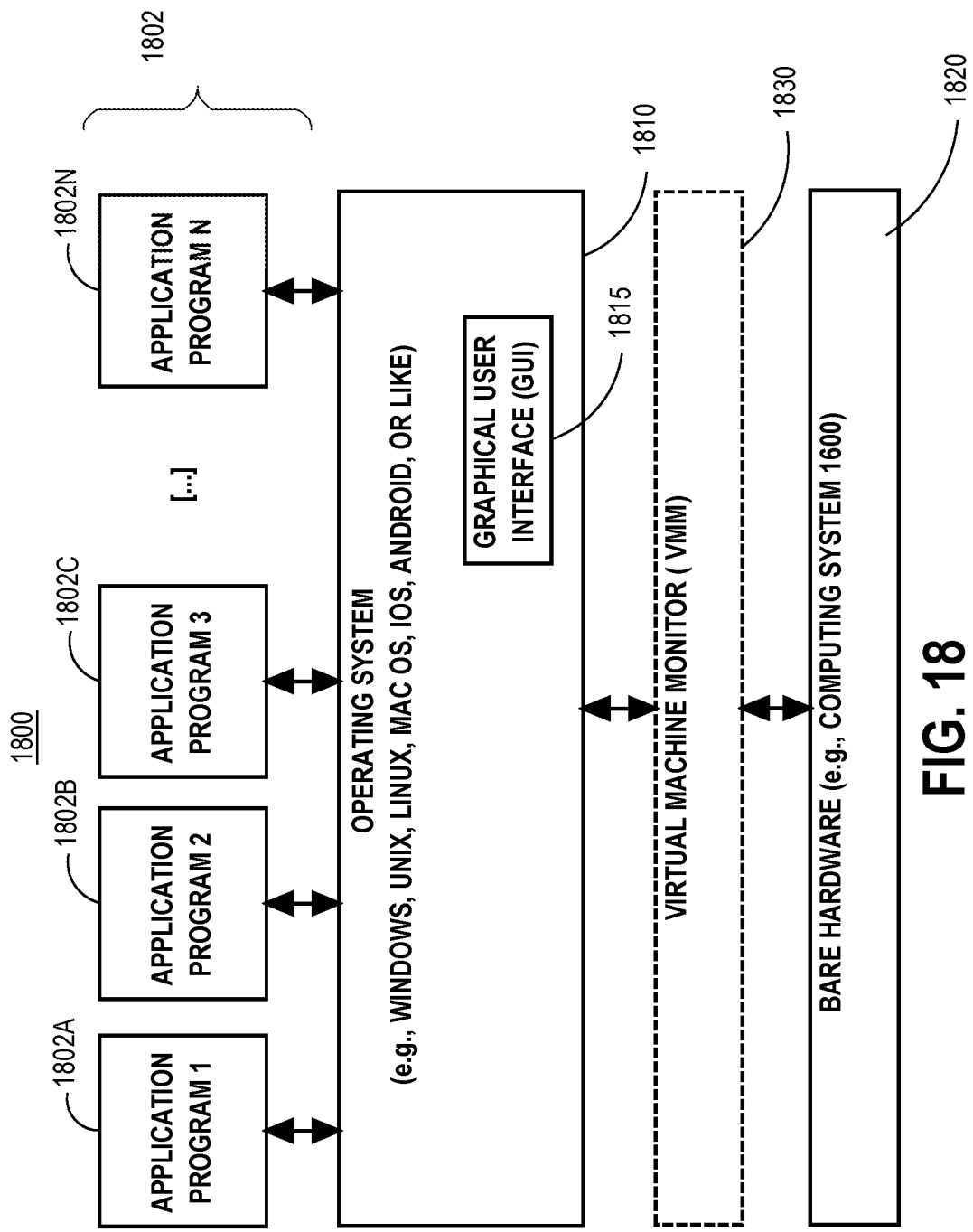
FIG. 18 depicts a software system that may be employed for controlling the operation.

FIG. 18 is a block diagram of a basic software system 1800 that may be employed for controlling the operation of computer system 1700. Software system 1800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1800 is provided for directing the operation of computer system 1700. Software system 1800, which may be stored in system memory (RAM) 1706 and on fixed storage (e.g., hard disk or flash memory) 1710, includes a kernel or operating system (OS) 1810.

The OS 1810 manages low-level aspects of computer operation, including managing execution of processes, memory allocation, file input and output (I/O), and device I/O. One or more application programs, represented as 1802A, 1802B, 1802C . . . 1802N, may be "loaded" (e.g., transferred from fixed storage 1710 into memory 1706) for execution by the system 1800. The applications or other software intended for use on computer system 1700 may also be stored as a set of downloadable computer-executable instructions, for example, for downloading and installation from an Internet location (e.g., a Web server, an app store, or other online service).

Software system 1800 includes a graphical user interface (GUI) 1815, for receiving user commands and data in a graphical (e.g., "point-and-click" or "touch gesture") fashion. These inputs, in turn, may be acted upon by the system 1800 in accordance with instructions from operating system 1810 and/or application(s) 1802. The GUI 1815 also serves to display the results of operation from the OS 1810 and application(s) 1802, whereupon the user may supply additional inputs or terminate the session (e.g., log off).

OS 1810 can execute directly on the bare hardware 1820 (e.g., processor(s) 1704) of computer system 1700. Alternatively, a hypervisor or virtual machine monitor (VMM) 1830 may be interposed between the bare hardware 1820 and the OS 1810. In this configuration, VMM 1830 acts as a software "cushion" or virtualization layer between the OS 1810 and the bare hardware 1820 of the computer system 1700.

VMM 1830 instantiates and runs one or more virtual machine instances ("guest machines"). Each guest machine comprises a "guest" operating system, such as OS 1810, and one or more applications, such as application(s) 1802, designed to execute on the guest operating system. The VMM 1830 presents the guest operating systems with a virtual operating platform and manages the execution of the guest operating systems.

In some instances, the VMM 1830 may allow a guest operating system to run as if it is running on the bare hardware 1820 of computer system 1700 directly. In these instances, the same version of the guest operating system configured to execute on the bare hardware 1820 directly may also execute on VMM 1830 without modification or reconfiguration. In other words, VMM 1830 may provide full hardware and CPU virtualization to a guest operating system in some instances.

In other instances, a guest operating system may be specially designed or configured to execute on VMM 1830 for efficiency. In these instances, the guest operating system is "aware" that it executes on a virtual machine monitor. In other words, VMM 1830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    executing a database transaction, wherein executing a database transaction includes:
    a database management system (DBMS) receiving a request to change a JavaScript Object Notation (JSON) object in a JSON object view comprising a JSON DUALITY VIEW, said JSON DUALITY VIEW defining an object schema for a JSON object in said JSON DUALITY VIEW, said DUALITY VIEW mapping base attributes of a plurality of base tables to fields of said object schema, said request specifying a change to at least one field of said JSON object;
    generating a derived set of derived records derived from said JSON object according to said JSON DUALITY VIEW mapping said base attributes of said plurality of base tables to said fields of said object schema;
    comparing said derived set of derived records to one or more base records stored in said plurality of base tables of a database;
    based on said comparing of said derived set of derived records to said one or more base records, determining that one or more changes to said JSON object represent an update to one or more attributes of said one or more base records stored in said plurality of base tables of said database;
    executing one or more change operations to make said one or more changes to said one or more base records; and
    committing said one or more changes.

2. The method of claim 1, wherein determining that one or more changes to said JSON object represent an update includes:
    retrieving from said plurality of base tables a base set of base records, each base record of said base record being a version of a respective derived record from said derived set.

3. The method of claim 2, wherein determining that one or more changes to said JSON object represent an update includes comparing said derived set to said base set to determine that a plurality of derived records represents a change to a respective base record of said base set of base records.

4. The method of claim 1, wherein said plurality of base tables include a parent table and child table that have 1-to-N relationship based on a primary key in said parent table and a foreign key in said child table, wherein said one or more change operations include an update to said child table.

5. The method of claim 1,
    wherein said object schema defines an object hierarchy comprising a first level and a second level;
    wherein said object schema defines an object field that corresponds to said first level and a plurality of child fields of said object field that correspond to said second level;
    wherein said plurality of base tables include a parent table and a child table of said parent table;
    wherein said JSON DUALITY VIEW maps said child table as a base table for said child fields based on a primary key of said child table and a foreign key of said parent table;
    wherein said one or more changes update a record in said child table.

6. The method of claim 1,
    wherein said object schema defines an object hierarchy comprising a first level and a second level;
    wherein said object schema defines an array field that corresponds to said first level and a plurality of child fields that correspond to said second level;
    wherein said plurality of base tables include a parent table and a child table of said parent table;
    wherein said JSON DUALITY VIEW maps said child table as a base table for said child fields based on a foreign key of said child table and a primary key of said parent table;

wherein said one or more changes update a record in said child table.

7. The method of claim 1,
wherein said JSON DUALITY VIEW identifies a change permission to update a base table of said plurality of base tables;
wherein said one or more updates include a particular update to an attribute of a record in said base table;
wherein executing the database transaction further includes determining that said change permission permits said particular update.

8. The method of claim 1,
wherein said JSON DUALITY VIEW identifies a change permission to update a particular attribute of a base table of said plurality of base tables;
wherein said one or more changes include a particular update to an attribute of a record in said base table; and
wherein executing the database transaction further includes determining that said change permission permits said particular update.

9. The method of claim 1,
wherein said one or more attributes are one or more columns stored in a relational DBMS, or
wherein said one or more attributes are one or more fields of JSON objects stored in document storage system.

10. The method of claim 1, further comprising:
generating a delta record set based at least in part on said comparing of said derived set of derived records to said one or more base records, said delta record set representing one or more differences between the derived set of derived records,
wherein said determining that said one or more changes to said JSON object represent said update to said one or more attributes of said one or more base records is further based at least in part on said delta record set.

11. One or more non-transitory computer-readable media storing one or more sequences of instructions that, when executed by computing devices, cause:
executing a database transaction, wherein executing a database transaction includes:
a database management system (DBMS) receiving a request to change a JavaScript Object Notation (JSON) object in a JSON object view comprising a JSON DUALITY VIEW, said JSON Duality View defining an object schema for a JSON object in said JSON DUALITY VIEW, said JSON DUALITY VIEW mapping base attributes of a plurality of base tables to fields of said object schema, said request specifying a change to at least one field of said JSON object;
generating a derived set of derived records derived from said JSON object according to said JSON DUALITY VIEW mapping said base attributes of said plurality of base tables to said fields of said object schema;
comparing said derived set of derived records to one or more base records stored in said plurality of base tables of a database;
based on said comparing of said derived set of derived records to said one or more base records, determining that one or more changes to said JSON object represent an update to one or more attributes of said one or more base records stored in said plurality of base tables of said database;
executing one or more change operations to make said one or more changes to said one or more base records; and
committing said one or more changes.

12. The one or more non-transitory computer-readable media of claim 11, wherein determining that one or more changes to said JSON object represent an update includes:
retrieving from said plurality of base tables a base set of base records, each base record of said base record being a version of a respective derived record from said derived set.

13. The one or more non-transitory computer-readable media of claim 12, wherein determining that one or more changes to said JSON object represent an update includes comparing said derived set to said base set to determine that a plurality of derived records represents a change to a respective base record of said base set of base records.

14. The one or more non-transitory computer-readable media of claim 11, wherein said plurality of base tables include a parent table and child table that have 11-to-N relationship based on a primary key in said parent table and a foreign key in said child table, wherein said one or more change operations include an update to said child table.

15. The one or more non-transitory computer-readable media of claim 11,
wherein said object schema defines an object hierarchy comprising a first level and a second level;
wherein said object schema defines an object field that corresponds to said first level and a plurality of child fields of said object field that correspond to said second level;
wherein said plurality of base tables include a parent table and a child table of said parent table;
wherein said JSON DUALITY VIEW maps said child table as a base table for said child fields based on a primary key of said child table and a foreign key of said parent table;
wherein said one or more changes update a record in said child table.

16. The one or more non-transitory computer-readable media of claim 11,
wherein said object schema defines an object hierarchy comprising a first level and a second level;
wherein said object schema defines an array field that corresponds to said first level and a plurality of child fields that correspond to said second level;
wherein said plurality of base tables include a parent table and a child table of said parent table;
wherein said JSON DUALITY VIEW maps said child table as a base table for said child fields based on a foreign key of said child table and a primary key of said parent table;
wherein said one or more changes update a record in said child table.

17. The one or more non-transitory computer-readable media of claim 11,
wherein said JSON DUALITY VIEW identifies a change permission to update a base table of said plurality of base tables;
wherein said one or more updates include a particular update to an attribute of a record in said base table;
wherein executing the database transaction further includes determining that said change permission permits said particular update.

18. The one or more non-transitory computer-readable media of claim 11,
wherein said JSON DUALITY VIEW identifies a change permission to update a particular attribute of a base table of said plurality of base tables;
wherein said one or more changes include a particular update to an attribute of a record in said base table; and wherein executing the database transaction further includes determining that said change permission permits said particular update.

19. The one or more non-transitory computer-readable media of claim 11,
   wherein said one or more attributes are one or more columns stored in a relational DBMS, or
   wherein said one or more attributes are one or more fields of JSON objects stored in document storage system.

20. The one or more non-transitory computer-readable media of claim 11, wherein said one or more sequences of instructions, when executed by said computing devices, further cause:
   generating a delta record set based at least in part on said comparing of said derived set of derived records to said one or more base records, said delta record set representing one or more differences between the derived set of derived records,
wherein said determining that said one or more changes to said JSON object represent said update to said one or more attributes of said one or more base records is further based at least in part on said delta record set.

* * * * *

UNITED STATES PATENT AND TRADEMARK OFFICE
CERTIFICATE OF CORRECTION

| | | |
|---|---|---|
| PATENT NO. | : 12,287,777 B2 | Page 1 of 1 |
| APPLICATION NO. | : 17/966730 | |
| DATED | : April 29, 2025 | |
| INVENTOR(S) | : Liu et al. | |

It is certified that error appears in the above-identified patent and that said Letters Patent is hereby corrected as shown below:

In the Specification

In Column 2, Line 37, delete "Views" and insert -- Views. --, therefor.

In Column 4, Line 34, delete "XML," and insert -- XML --, therefor.

In Column 5, Line 32, delete "empno":" and insert -- "empno": --, therefor.

In Column 8, Line 18, after "OSON OSON" delete "OSON".

In Column 14, Line 35, delete "ass_projid" and insert -- ass_proj_id --, therefor.

In Column 15, Line 53, delete "object_sig( )" and insert -- obj ect_sig(). --, therefor.

In Column 16, Line 58, delete "record_sig( )" and insert -- record_sig(), --, therefor.

In Column 30, Line 65, delete "(MondoDB™" and insert -- (MongoDB™ --, therefor.

In the Claims

In Column 38, Line 1, in Claim 1, delete "said DUALITY" and insert -- said JSON DUALITY --, therefor.

In Column 38, Line 37, in Claim 4, delete "tab les" and insert -- tables --, therefor.

Signed and Sealed this
Twenty-second Day of July, 2025

Coke Morgan Stewart
*Acting Director of the United States Patent and Trademark Office*